(12) United States Patent
Johns et al.

(10) Patent No.: US 10,919,043 B2
(45) Date of Patent: Feb. 16, 2021

(54) SAMPLE TUBE RACK AND SAMPLE TUBE ANALYSING SYSTEM

(71) Applicant: Beckman Coulter, Inc., Brea, CA (US)

(72) Inventors: Charles W. Johns, Brownsburg, IN (US); Thomas Krafczyk, Olching (DE)

(73) Assignee: Beckman Coulter, Inc., Brea, CA (US)

( * ) Notice: Subject to any disclaimer, the term of this patent is extended or adjusted under 35 U.S.C. 154(b) by 0 days.

(21) Appl. No.: 15/352,473

(22) Filed: Nov. 15, 2016

(65) Prior Publication Data

US 2017/0136467 A1 May 18, 2017

(30) Foreign Application Priority Data

Nov. 16, 2015 (EP) ..................................... 15003260

(51) Int. Cl.
*B01L 9/06* (2006.01)
*G01N 35/00* (2006.01)
(Continued)

(52) U.S. Cl.
CPC .......... *B01L 9/06* (2013.01); *G01N 35/00732* (2013.01); *G01N 35/026* (2013.01); *G01N 35/04* (2013.01); *B01L 2200/025* (2013.01); *B01L 2200/028* (2013.01); *B01L 2300/022* (2013.01); *B01L 2300/0609* (2013.01);
(Continued)

(58) Field of Classification Search
CPC ...................................................... B01L 9/06
See application file for complete search history.

(56) References Cited

U.S. PATENT DOCUMENTS 3,604,566 A 9/1971 Rem et al.
4,090,850 A 5/1978 Chen et al.
(Continued)

FOREIGN PATENT DOCUMENTS

CN 2810594 Y 8/2006
CN 201689104 U 12/2010
(Continued)

OTHER PUBLICATIONS

U.S. Appl. No. 29/607,873, filed Jun. 16, 2017.
(Continued)

*Primary Examiner* — Paul S Hyun
(74) *Attorney, Agent, or Firm* — Schwegman Lundberg & Woessner, P.A.

(57) ABSTRACT

A sample tube rack for receiving at least one sample tube comprises an upper part comprising an upper surface, wherein at least one upper opening for receiving the sample tube is provided in the upper surface; an intermediate part comprising an intermediate surface, wherein at least one intermediate opening for receiving the sample tube is provided in the intermediate surface; and a lower part comprising a supporting surface, wherein at least one supporting position for supporting the sample tube is provided in the supporting surface. Therein, the intermediate part is connected to both the upper part and the lower part such that the at least one upper opening is substantially aligned above the at least one intermediate opening and above the at least one supporting position for receiving the at least one sample tube. At least one gripping orifice is provided in a lateral side of the lower part.

20 Claims, 9 Drawing Sheets

Figure 1:
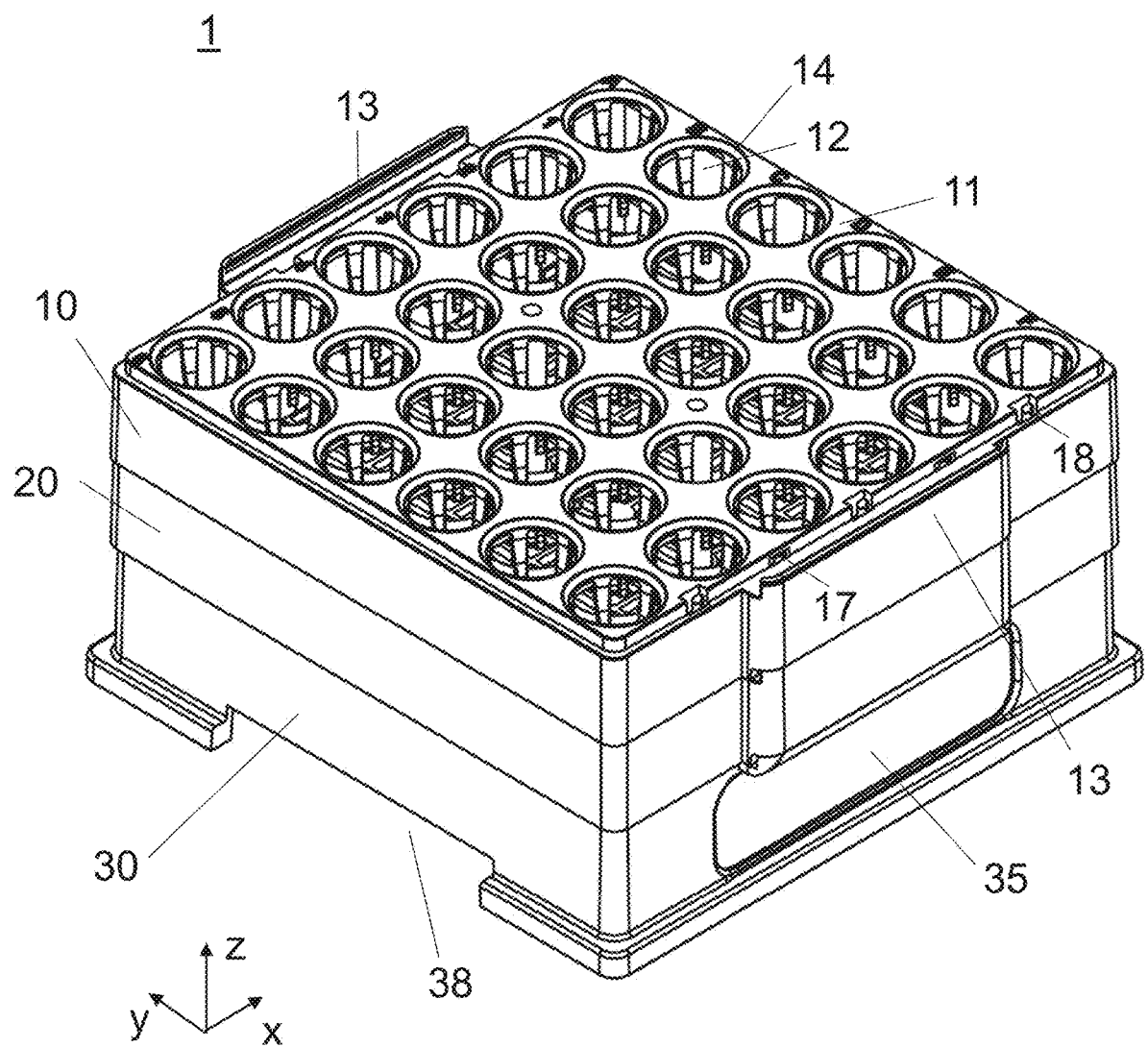

(51) Int. Cl.
  *G01N 35/02* (2006.01)
  *G01N 35/04* (2006.01)
(52) U.S. Cl.
  CPC ............... *B01L 2300/123* (2013.01); *G01N 2035/00742* (2013.01); *G01N 2035/00772* (2013.01); *G01N 2035/00801* (2013.01); *G01N 2035/0427* (2013.01); *G01N 2035/0498* (2013.01)

(56) References Cited

U.S. PATENT DOCUMENTS

| | | | |
|---|---|---|---|
| 4,284,603 A | 8/1981 | Korom | |
| D265,126 S | 6/1982 | Beall | |
| D302,207 S | 7/1989 | Matkovich | |
| 5,080,232 A | 1/1992 | Leoncavallo et al. | |
| 5,128,105 A | 7/1992 | Berthold et al. | |
| 5,169,603 A * | 12/1992 | Landsberger | B01L 9/06 211/74 |
| 5,318,753 A | 6/1994 | Honda | |
| 5,456,360 A | 10/1995 | Griffin | |
| 5,579,929 A | 12/1996 | Schwartz | |
| 5,651,941 A | 7/1997 | Stark et al. | |
| D382,346 S | 8/1997 | Buhler et al. | |
| 5,785,927 A | 7/1998 | Scott et al. | |
| 5,902,549 A | 5/1999 | Mimura et al. | |
| D413,391 S | 8/1999 | Lapeus et al. | |
| 5,939,024 A | 8/1999 | Robertson | |
| D414,271 S | 9/1999 | Mendoza | |
| 5,996,818 A | 12/1999 | Boje et al. | |
| D428,497 S | 7/2000 | Lapeus et al. | |
| 6,132,684 A | 10/2000 | Marino | |
| 6,190,619 B1 | 2/2001 | Kilcoin et al. | |
| D448,854 S | 10/2001 | Kuiper et al. | |
| D461,554 S | 8/2002 | Lafond et al. | |
| D466,219 S | 11/2002 | Wynschenk et al. | |
| 6,533,133 B2 | 3/2003 | Liu | |
| 6,568,544 B1 | 5/2003 | Lafond et al. | |
| 6,932,942 B2 | 8/2005 | Itoh | |
| 7,000,785 B2 | 2/2006 | Jafari et al. | |
| 7,122,158 B2 | 10/2006 | Itoh | |
| 7,169,361 B2 | 1/2007 | Arnold, Jr. et al. | |
| 7,191,904 B2 | 3/2007 | Wscott, III | |
| 7,282,182 B2 | 10/2007 | Dale et al. | |
| D595,420 S | 6/2009 | Suzuki et al. | |
| D596,312 S | 7/2009 | Giraud et al. | |
| 7,611,675 B2 | 11/2009 | Sevigny et al. | |
| D622,860 S | 8/2010 | Karpiloff | |
| D628,305 S | 11/2010 | Gorrec et al. | |
| D628,306 S | 11/2010 | Blanc et al. | |
| 7,824,615 B2 | 11/2010 | Balli | |
| D632,404 S | 2/2011 | Karpiloff | |
| 7,910,067 B2 | 3/2011 | Knight et al. | |
| D639,447 S | 6/2011 | Karpiloff | |
| 8,312,781 B2 | 11/2012 | Himmelsbach et al. | |
| D672,881 S | 12/2012 | Kraihanzel | |
| D674,507 S | 1/2013 | Suzuki et al. | |
| D675,338 S | 1/2013 | Suzuki et al. | |
| D675,748 S | 2/2013 | Hilligoss et al. | |
| D686,749 S | 7/2013 | Trump | |
| 8,580,195 B2 | 11/2013 | Frey et al. | |
| D699,371 S | 2/2014 | Williams et al. | |
| D710,024 S | 7/2014 | Guo | |
| 8,845,985 B2 | 9/2014 | Herchenbach et al. | |
| 8,940,252 B2 | 1/2015 | Ziegler | |
| D724,236 S | 3/2015 | Motadel et al. | |
| D729,404 S | 5/2015 | Teich et al. | |
| 9,046,506 B2 | 6/2015 | Mueller et al. | |
| 9,144,801 B2 | 9/2015 | Johnson et al. | |
| 9,358,542 B2 | 6/2016 | Tyagi et al. | |
| 9,423,409 B2 | 8/2016 | Friedman | |
| 9,482,684 B2 | 11/2016 | Johns et al. | |
| 9,505,005 B2 | 11/2016 | Takai | |
| 9,630,179 B2 | 4/2017 | Knight et al. | |
| D785,428 S | 5/2017 | Friesen | |
| 9,636,681 B2 | 5/2017 | Ohga et al. | |
| D808,540 S | 1/2018 | Johns et al. | |
| D812,243 S | 3/2018 | Johns et al. | |
| D812,244 S | 3/2018 | Shanafelter et al. | |
| 9,943,849 B2 | 4/2018 | Johnson et al. | |
| D844,806 S | 4/2019 | Johns et al. | |
| 2002/0068022 A1 | 6/2002 | Schneider | |
| 2002/0108917 A1 | 8/2002 | Maruyama | |
| 2003/0017084 A1 | 1/2003 | Dale et al. | |
| 2003/0235519 A1 | 12/2003 | Sha et al. | |
| 2005/0180895 A1 | 8/2005 | Itoh | |
| 2008/0131328 A1 | 6/2008 | Schutt et al. | |
| 2009/0065458 A1 * | 3/2009 | Murray | B01L 9/06 211/85.18 |
| 2010/0203643 A1 * | 8/2010 | Self | B01L 9/06 436/47 |
| 2011/0274595 A1 * | 11/2011 | Ziegler | B01L 9/06 422/562 |
| 2011/0306118 A1 | 12/2011 | Belz et al. | |
| 2012/0195808 A1 | 8/2012 | Arras et al. | |
| 2013/0195720 A1 | 8/2013 | Behnk et al. | |
| 2013/0315800 A1 | 11/2013 | Yin et al. | |
| 2014/0140804 A1 | 5/2014 | Focke et al. | |
| 2014/0287515 A1 | 9/2014 | Habrich et al. | |
| 2015/0101911 A1 | 4/2015 | Friedman | |
| 2015/0174579 A1 | 6/2015 | Iten et al. | |
| 2016/0101422 A1 | 4/2016 | Bucher et al. | |
| 2016/0161521 A1 | 6/2016 | Sakairi et al. | |
| 2016/0320421 A1 | 11/2016 | Trump et al. | |
| 2016/0333337 A1 | 11/2016 | Duffy et al. | |
| 2017/0043346 A1 | 2/2017 | Welch et al. | |
| 2017/0136467 A1 | 5/2017 | Johns et al. | |

FOREIGN PATENT DOCUMENTS

| | | |
|---|---|---|
| CN | 202078914 | 12/2011 |
| CN | 202277846 U | 6/2012 |
| CN | 102989539 A | 3/2013 |
| DE | 19849714 A1 | 5/1999 |
| EP | 0753748 | 1/1997 |
| EP | 0965385 | 12/1999 |
| EP | 2081128 B1 | 12/2012 |
| EP | 2179025 B1 | 10/2016 |
| EP | 3167962 A1 | 5/2017 |
| GB | 2520521 A | 5/2015 |
| JP | 2001272408 A | 10/2001 |
| JP | 5686899 B2 | 3/2015 |
| WO | 2005093433 | 10/2005 |
| WO | 2006/113854 A2 | 10/2006 |
| WO | 2008014117 | 1/2008 |
| WO | 2012/030877 A2 | 3/2012 |

OTHER PUBLICATIONS

European Search Report and Opinion dated May 27, 2016 for EP Patent Application No. 15003260.5, 7 pages.
U.S. Appl. No. 29/572,615, filed Jul. 28, 2016.
U.S. Appl. No. 29/572,596, filed Jul. 28, 2016.
PCT/US2018/037930 , "International Search Report and Written Opinion", dated Aug. 9, 2018, 14 pages.
U.S. Appl. No. 29/634,473, filed Jan. 22, 2018.
U.S. Appl. No. 29/639,293, filed Mar. 5, 2018.
"European Application Serial No. 15003260.5, Extended European Search Report dated May 27, 2016", 8 pgs.

* cited by examiner

A-A

SAMPLE TUBE RACK AND SAMPLE TUBE ANALYSING SYSTEM

This application claims benefit of European Application No. 15003260.5, filed Nov. 16, 2015, the entire content of which is incorporated herein by reference.

The invention relates to a sample tube rack for receiving at least one sample tube and to a sample tube analyzing system for analyzing the content of at least one sample tube.

Sample tube racks are used for receiving, holding, aligning, and/or retaining one or a plurality of sample tubes. Automated analyzers are in common use for analyzing the content of a sample tube for a variety of purposes. For example, a plurality of biological specimens may be analyzed and/or processed in a coordinated transfer system. Sample tubes containing, e.g., liquids may be transported to a fluid transfer station where fluid transfer devices such as robotic pipets transfer materials to or from the sample tubes. To ensure that the sample tubes are positioned and/or conveyed within the analyzer while maintaining a substantially upright orientation, the sample tubes may be stored in sample tube racks. The sample tube rack safely holds the sample tubes by applying retaining forces to the sample tube, thereby enabling a safe receipt of the sample tube within the sample tube rack, while also allowing withdrawal of a sample tube by a robotic device.

Common sample tube racks comprise a compact build to save space within the analyzing system and to position the sample tubes space-efficiently such that a robot gripper can easily access each sample tube. Within this compact build, as many sample tube holders as possible are formed within the sample tube rack.

A problem relates to providing an improved transportation of the compact sample tube racks.

This problem is solved by the subject-matter of the independent claims. Preferred embodiments are the subject-matter of the dependent claims.

According to a first aspect, a sample tube rack is provided for receiving at least one sample tube, the sample tube rack comprising:
- an upper part comprising an upper surface, wherein at least one upper opening for receiving the sample tube is provided in the upper surface;
- an intermediate part comprising an intermediate surface, wherein at least one intermediate opening for receiving the sample tube is provided in the intermediate surface; and
- a lower part comprising a supporting surface, wherein at least one supporting position for supporting the sample tube is provided in the supporting surface.

Therein, the intermediate part is connected to both the upper part and the lower part such that the at least one upper opening is substantially aligned above the at least one intermediate opening and above the at least one supporting position for receiving the at least one sample tube. Furthermore, at least one gripping orifice is provided in a lateral side of the lower part.

The sample tube rack is adapted and configured to receive at least one sample tube, preferably a plurality of sample tubes. The sample tube rack is adapted to receive, to hold, to align, and/or to retain this one sample tube or this plurality of sample tubes in a safe position, preferably in an upright position. The sample tube rack comprises a plurality of elements or parts, three of which are the upper part, the intermediate part, and the lower part. In one embodiment, the sample tube rack consists only of said three parts.

The tube rack, in its assembled form, may be provided as substantially shaped like a cuboid and/or a box.

The sample tube racks may be used to introduce and remove sample tubes from automation equipment, e.g. a tube analyzer system. The sample tube rack may be configured to keep multiple different types and/or sizes of sample tubes centered with their receptacles so automation equipment may effectively interact with the sample tubes.

The upper surface of the upper part may form the upper surface of the sample tube rack in its assembled state. The at least one upper opening in the upper surface is adapted to receive the sample tube. The upper opening may be provided as substantially circular, wherein the inner diameter of the upper opening is larger than the outer diameter of the sample tube with the largest diameter the sample tube rack is configured to receive. Thus, the sample tube rack is adapted to receive one or more predetermined kinds of sample tubes by inserting the sample tube into the upper opening.

The intermediate opening may also be provided as a substantially circular opening in the intermediate surface. The inner diameter of the intermediate opening is also larger than the outer diameter of the biggest sample tube the sample tube rack is adapted to receive. The upper opening and the intermediate opening may be provided with identical dimensions. Preferably, the inner diameter of the upper opening and/or the inner diameter of the intermediate opening are at least 1% larger than the outer diameter of the biggest sample tube the sample tube rack is adapted to receive. Furthermore, the diameter of said openings might not be larger than 20% of said outer diameter.

The intermediate part may be directly and/or physically connected to both the upper part and the lower part, without any further component or element of the sample tube rack arranged between said parts.

The supporting position in the supporting surface may be provided as a supporting recess and/or upper portion of the supporting surface that may be adapted to carry and support the weight of a sample tube filled with a sample. In the assembled form of the sample tube rack, the upper opening, the intermediate opening, and the supporting position are substantially vertically aligned to provide a receiving function of the sample tube. In other words, the upper opening may be directly or almost directly above the intermediate opening. Further, the intermediate opening may be directly or almost directly above the supporting position. In case the sample tube rack is adapted to receive a plurality of sample tubes, each of a plurality of the upper openings is aligned above one of the intermediate openings, and each of the intermediate openings is aligned above one of the supporting positions. Thereby, a plurality of receiving positions, i.e., receivers or holders, for a plurality of sample tubes is provided.

Said receiving positions, each comprising an upper opening, an intermediate opening, and a supporting position, may be aligned and provided in rows and columns within the sample tube rack.

At a lateral side and/or wall of the sample tube rack, more precisely at a lateral side and/or wall of the lower part, the gripping orifice is provided. The term "lateral" refers to a side of the rack excluding the upper side and the bottom side of the sample tube rack. In an embodiment wherein the sample tube rack is substantially shaped as a cuboid, the term "lateral side" may refer to a left side, a right side, a front side, and/or a back side of the sample tube rack, but it may not refer to the upper side or the bottom side of the sample tube rack. Within the frame of reference of the Earth, the lateral side may refer to any side limiting the horizontal extension of the sample tube rack but not any side limiting the vertical extension of the sample tube rack.

Within the frame of reference of the Earth, the sample tube rack is provided and adapted to receive the sample tube in an upright position, namely in a substantially vertical position. Thus, a closed tube bottom (providing a first end of the sample tube) may rest upon and/or abut the supporting position, while the opposing (second) end of the sample tube, namely an open or capped end, is arranged and held above and outside of the sample tube rack. In this vertical position, the upper (e.g. open) end of the sample tube protrudes out of the sample tube rack and may be grabbed by a robot.

The upper surface, the intermediate surface, and/or the supporting surface may be arranged substantially parallel to each other in a substantially horizontal plane.

The gripping orifice is adapted to receive at least one finger of an adult user, preferably all four fingers of an adult user opposing his thumb. The gripping orifice provides access for a user to safely carry the sample tube rack while balancing it on said finger(s) of the user's hand. Preferably, the gripping orifice is arranged to provide access into a carrying space arranged below the supporting surface, so that the user may hold the sample tube rack without touching and/or moving the sample tubes held within the sample tube rack.

Thereby, a sample tube rack is provided which may be carried by a user in a comfortable and safe way. Thus, the gripping orifice improves the transportation of the sample tube rack.

In an embodiment, the lateral side with the gripping orifice is arranged adjacent to the supporting surface and/or at an angle different from 0° and 180°, in particular substantially orthogonal, to the supporting surface. As explained above, the lateral side of the lower part may form a part of a lateral side of the sample tube rack. In particular, the lateral side of the sample tube rack may be connecting the upper surface with a base and/or lower surface of the sample tube rack. A lower portion of said lateral side of the sample tube rack will be provided as the lateral side and/or wall of the lower part. The gripping orifice is provided within this lateral wall of the lower part. In an embodiment wherein the sample tube rack is substantially shaped as a cuboid, the lateral side and/or wall of the sample tube rack (and, thus, the lateral side and/or wall of the lower part) will be arranged substantially orthogonal to the supporting surface, to the intermediate surface, and/or the upper surface of the sample tube rack.

In an embodiment, the gripping orifice is configured to enable lateral access into a carrying-space below the supporting area. When accessing the carrying-space with his finger(s), the user may carry the sample tube rack without altering the position of the sample tubes held within the sample tube rack, and/or without even touching any of those sample tubes, because his fingers may be separated from the sample tubes by the supporting surface. Thereby, an improved and especially safe transportation of the sample tube rack is enabled.

According to an embodiment, the sample tube rack comprises a thumb rest feature arranged above the gripping orifice, wherein the thumb rest feature may be provided as a lateral extension of the upper surface. In this embodiment, a user may carry the sample tube rack in one of his hands by accessing the gripping orifice with one or more of the fingers of his hand opposing his thumb, and by resting his thumb on the thumb rest feature. Thereby, improved carrying stability is provided. The thumb rest feature may be provided at the same lateral side of the sample tube rack as the gripping orifice. Preferably, the thumb rest feature is provided above the gripping orifice, e.g., as a lateral extension of the intermediate part and/or of the upper part. For example, the thumb rest feature may be provided as a lateral extension adjacent to the upper surface. Preferably, the thumb rest feature is arranged at a minimal distance from the closest adjacent upper opening of at least about 5 mm, preferably of at least about 7 mm. Thereby, it is ensured that a user may rest his thumb on the thumb rest feature without touching, contaminating, and/or moving a sample tube held within the rack and/or inserted into the upper opening closest to the thumb rest feature.

According to an embodiment, the sample tube rack comprises a plurality of upper openings, a plurality of intermediate openings, and a plurality of supporting positions arranged in aligned grids. Said grids are vertically aligned to form a plurality of aligned receiving positions for receiving and holding a single sample tube each. Therein, each receiving position comprises one upper opening, aligned substantially above one intermediate opening aligned substantially above one supporting position. Alignment of the receiving positions in a grid provides an efficient way to align the sample tubes, in particular for an automated access of the sample tubes within, e.g., a sample tube analyzing system.

According to an embodiment, the at least one supporting position comprises a recess which is shaped substantially convergent, particularly substantially conically, and is configured to receive and/or bear a sample tube bottom, in particular a sample tube bottom of a predetermined type. Because the supporting position is provided as a recess, the sample tube bottom may be comfortably deposited within said recess. A substantially downwards converging shape of the recess ensures that the closed bottom of the sample tube may move into a predetermined position within the sample tube rack. The recess may be configured to receive a single predetermined sample tube type, or a plurality of predetermined types comprising similar tube bottoms.

According to an embodiment, each of the first and the second openings comprises a rim at the surface in which it is provided, wherein at each rim at least three flexible restraining elements are provided for steadily holding the sample tube, wherein the flexible restraining elements may extend substantially downwards from the rim, such that they tend to extend along and slightly towards a vertical axis through the center of the respective opening. Each of the first and second opening comprises a rim forming a border of the respective opening. The rim may be provided by the material of the surface which may be provided as a substantially planar surface. At each rim, at least three flexible restraining elements are provided for steadily holding the sample tube within the opening. The at least three flexible restraining elements may be provided in an elongated shape, e.g. in form of an elongated arm, for holding the sample tube between them. The flexible restraining elements below the upper surface may be provided integrally with the upper part. The flexible restraining elements below the intermediate surface may be provided integrally with the intermediate part.

The flexible restraining elements may be provided at equidistant positions around the opening. For example, an opening may be provided with three flexible restraining elements, or with six flexible restraining elements. At least three flexible restraining elements provide a reliable restraining and holding function for the sample tube within the sample tube rack. The restraining elements may be provided at an underside of the upper surface and/or at an underside of the intermediate surface. The flexible restraining elements extend substantially downwards from the rim, and may also tend to extend slightly inwards, namely towards the vertical axis through the center of the respective opening. This means that the flexible restraining elements extend substantially downwards and a bit inwards towards the center of the opening. When a sample tube is inserted in the opening from above, the sample tube touches the flexible restraining elements, thereby bending them slightly outwards, in a direction facing radially outwards from the vertical axis through the center of the respective opening. Thereby, the flexible restraining elements are bent outwards and apply a gripping force onto the sample tube. Thus, the sample tube may be steadily held within the respective receiving position of the sample tube rack between the flexible restraining elements.

The flexible restraining elements may be configured such that a sample tube type with the smallest diameter that is supposed to be used with the sample rack is held sufficiently tight within the rack, even when the rack is flipped over. Furthermore, the flexible restraining elements may be configured such that it is possible to insert the sample tube type with the largest diameter without problem. Also, the flexible restraining elements may be configured such that a robotic gripper may be able to remove any type of sample tube from the rack without problem.

The flexible restraining elements may be configured such that the main weight of the sample tube and their content is held by the flexible restraining elements and not by the supporting position. The rack may be configured such that the sample tubes may be placed in the rack such that the bottom of the sample tubes will make contact with the supporting surface. Some sample tubes may be just fixed via the elastic fingers, having scarcely or no contact with the supporting surface.

By providing at least three flexible restraining elements, the sample tube may also be aligned in a predetermined position within the first and second opening, and also at the receiving position.

According to an embodiment, the upper part, the intermediate part, and the lower part are each provided as an injection molding. Injection moldings may be produced industrially at a relatively low cost. Not any possible geometrical and complex shape may be formed by an injection molding. However, each of the upper part, the intermediate part, and the lower part are designed stable and simple enough to be produced as an injection molding.

According to an embodiment, the upper part and the intermediate part are identical in construction. In this embodiment, the upper part and the intermediate part comprise an identical design. This enables, e.g., using the same casting mold to construct both the intermediate part and the upper part of the sample tube rack. One benefit of this design is that only one molding tool is required for the upper and the intermediate part and said molding tool can be constructed in a simple way without the need of "sliders" that would complicate the molding process. Thereby, the production is simplified and less expensive.

According to an embodiment, the sample tube rack comprises connecting features for enabling a plug connection of the intermediate part with both the upper part and the lower part, in particular a plug connection which is configured to be manually unpluggable. Therein, the intermediate part may comprise some or all of said connecting features. The lower part may comprise corresponding connecting features for engaging into the plug connection with the intermediate part. Furthermore, also the upper part may comprise corresponding connection features for engaging into the plug connection with the intermediate part. The plug connection may be of a kind that is unpluggable, or only unpluggable by use of a tool. Unplugging the plug connection without the tool might damage the sample tube rack. Thereby, a strong and durable connection between the parts of the sample tube rack is provided. Preferably, the plug connection may be established manually, without the use of any tool. In an alternative embodiment, the plug connection may only be established by use of a tool, e.g. a press applying a predetermined pressure or an alignment tool.

According to an embodiment, the lower part comprises a bottom and/or base configured for an aligned arrangement on a rack resting area, wherein the lower part may comprise a lift-off prevention feature for preventing an unintended lift of the sample tube rack from the rack resting area. The rack resting area may be provided as predetermined position within a sample tube analyzing system to arrange the sample tube rack upon. For example, only one (i.e. rotational) orientation of each sample tube rack may be possible due to an interaction of the design of the lower part of the sample tube rack with an alignment feature of the rack resting area. Together with rack geometry related information that may be stored on the RFID tag, the orientation of the rack may be used to make an analyzing system aware of the position of each individual sample tube position on the rack.

The sample tube rack may be arranged on the rack resting area while sample tubes are picked up from the sample tube rack and/or put back into the sample tube rack by, e.g., a robot. When one of the sample tubes is picked up from the sample tube rack, there is a risk of the whole sample tube rack being lifted off from the rack resting area due to a restraining force within the sample tube rack, e.g., by the flexible restraining elements as disclosed above. To prevent such an unintended lift-off of the sample tube rack as a whole, the sample tube rack is provided with the lift-off prevention feature. The lift-off prevention feature may be provided as a lateral extension, e.g., a rim at and/or along a base of the lower part. At the rack resting area, a corresponding extension may be provided to interact with the lift-off prevention feature in a way that holds the sample tube rack down even though a lifting force is applied to the sample tube rack.

In an exemplary tube analyzing system, one or more sample input/output drawers are provided whereon sample tube racks may be arranged at defined positions. Each drawer may comprise one or more rack resting areas, upon which the sample tube racks may be arranged. When the drawer is closed, the protruding lift-off prevention feature of the sample tube rack is arranged below a slightly overhanging sheet, e.g., at slide rails on both sides of the drawer. Thus, when the drawer is fully inserted, the sample tube rack may not be lifted from its place.

By providing the sample tube rack with the lift-off prevention feature, the safety of the processing within the sample tube analyzing system is increased. In particular, an accident-risk caused by an unintentional and uncontrolled lifting of the sample tube rack is reduced. The lift-off prevention feature may be provided as a protrusion and/or recess at an outer, e.g. lateral, side of the sample tube rack.

According to an embodiment, the sample tube rack is stackable on and/or below an identically constructed sample tube rack. Similar to a construction kit, the sample tube racks are stackable so that they don't slide off from each other in a lateral direction when arranged on top of each other. Therefore, the base of the sample tube rack may comprise a reception area provided to be at least partially stackable over the upper surface of an identical sample tube rack.

According to an embodiment, the sample tube rack comprises an RFID-tag receiving area. Said RFID-tag receiving area may be provided at a lower portion of the sample tube rack, in particular at and/or within the lower part of the sample tube rack. The RFID-tag receiving area may be provided with clipping features enabling clipping of an RFID tag into and/or onto the RFID-tag receiving area. Thereby, an automatic identification of the sample tube rack is enabled by use of an RFID-tag reader.

An RFID-tag reader may be positioned at the rack resting area described above. The RFID-tag receiving area may be arranged in proximity of the bottom of the sample tube rack. RFID antennas arranged in a grid on or below the rack resting area (e.g. the drawer surface) may then easily differentiate between various RFID-tags of different sample tube racks. A transmission power of the RFID antennae may be rather limited in such a setup, so neighboring RFID-tags are not also read accidentally.

The RFID-tag may comprise information related to the Rack geometry and/or related to individual sample tubes sitting in the rack. A (bar) code printed on the outside (front or back) of the sample tube rack may be mirroring at least an RFID-tag ID and/or information about the Rack geometry.

According to an embodiment, identification information is provided on a lateral side of the sample tube rack in an optically readable form. The identification information may be provided as a bar code. The identification information may be printed and/or engraved on a lateral side of the sample tube rack, e.g. by a laser. To enable reading the identification information even though the sample tube rack is carried by a user, the identification information is printed on a lateral side different from the lateral side in which the gripping orifice is provided. The identification information may be provided on the upper part only.

According to an embodiment, the upper part, the intermediate part, and the lower part are sufficient to enable a steady sample tube receiving function of the sample tube rack. In other words, only those three parts contribute to the stability of the sample tube rack, and only those three parts are needed to provide the full functionality of the sample tube rack, e.g. safely holding, restraining, receiving, and/or aligning the sample tube within the sample tube rack. In other words, no further parts, namely no further intermediate parts are required to provide said functionality. In an embodiment, the sample tube rack only consists of the lower part, the intermediate part, and the upper part and, optionally, an RFID-tag identifier, e.g. an RFID-tag.

According to an embodiment, the intermediate part is directly connected to both the upper part and the lower part, wherein the intermediate part is only connected to the upper part and the lower part at lateral sides and/or walls of the sample tube rack. The intermediate part is in direct physical contact with both the upper part and the lower part.

Said physical contact is provided only at lateral sides of the sample tube rack, but not inside of the sample tube rack. For example, said contact may be provided along lateral walls of the sample tube rack. Thereby, the lower part, the intermediate part, and the upper part may each comprise lateral walls along which said three parts are connected to each other. In particular, the sample tube rack may comprise receiving positions and/or receiving areas for the sample tubes without individual walls adjacent to said receiving positions. In an embodiment, only the receiving positions arranged adjacent to a lateral side of the sample tube rack may comprise a wall, namely the outer lateral wall of the sample tube rack itself. However, the receiving positions arranged further inside of the sample tube rack are provided substantially wall-free. Thereby, the material required to produce the sample tube rack is reduced. Furthermore, the total weight of the sample tube rack is reduced.

In an embodiment, the intermediate part is directly connected to both the upper part and the lower part, wherein the intermediate part is only connected to the upper part and the lower part at lateral sides of the sample tube rack and/or at connecting features enabling a plug-connection between said parts. Therein, the receiving positions are also substantially wall-free as in the previous embodiment.

A second aspect relates to a sample tube analyzing system for analyzing the content of at least one sample tube, the sample tube analyzing system comprises a rack resting area provided in a drawer, wherein the rack resting area is configured for an aligned arrangement of the lower part of a sample tube rack according to the first aspect such that the gripping orifice is arranged in a manually accessible position when the drawer is arranged in an extended position. The sample tube analyzing system comprises a drawer, in which the sample tube rack or a plurality of sample tube racks may be arranged. To enter the sample tube rack into the sample analyzing system, the drawer is opened, namely moved in the extended position. In the extended position, the sample tube rack may be arranged upon the rack resting area, e.g. transported there by a user carrying the rack at the gripping orifice. A user may also access the gripping orifice with his fingers and lift the sample tube rack stored upon the rack resting area. The rack resting area may be provided on the surface of the drawer. In the extended position of the drawer, the gripping orifice is easily accessible, e.g. from a side of the drawer. After the rack resting area is loaded with a number of sample tube racks, the drawer may be closed and moved back into the sample tube analyzing system. In this shut position of the drawer, the gripping orifice might not be manually accessible. The sample tube analyzing system may be configured to pick up one or more sample tubes stored in the sample tube rack and/or to store one or more sample tubes in the sample tube rack. The sample tube analyzing system may be an automated analyzing system.

The sample tube analyzing system according to the second aspect is provided to receive a sample tube rack according to the first aspect. All features described above in regard to the first aspect are also applicable to the sample tube analyzing system according to the second aspect.

According to a third aspect, a sample tube rack is provided for receiving at least one sample tube, the sample tube rack is provided as a one-piece sample tube rack comprising at least one receptacle for receiving the sample tube and an upper surface, wherein at least one upper opening providing access into the at least one receptacle is provided in the upper surface. Therein, at least three flexible restraining elements are provided within the receptacle for steadily holding the sample tube within the receptacle.

The sample tube rack is adapted and configured to receive at least one sample tube, preferably a plurality of sample tubes. Thus, the sample tube rack may comprise a plurality of receptacles arranged below a plurality of upper openings. The sample tube rack is adapted to receive, to hold, to align, and/or to retain this one sample tube or this plurality of sample tubes in a safe position, preferably in an upright position.

The sample tube rack may be constructed as a single component, e.g. as a single injection molding, and may comprise a lower portion for placing the sample tube rack on a rack resting area. At least one gripping orifice may be provided in a lateral side of the single part.

The receptacle may be provided as a substantially vertically arranged, substantially tubular cavity within the sample tube rack. The flexible restraining elements may extend substantially downwards within the receptacle, such that they tend to extend along and slightly towards a vertical axis through the center of the respective upper opening. They may tend to extend slightly inwards, namely towards the vertical axis through the center of the respective opening. The at least three flexible restraining elements may be provided in an elongated shape, e.g. in form of an elongated arm or finger, for holding the sample tube between them. The flexible restraining elements may be provided integrally with the one-piece rack.

Within the receptacle, the at least three flexible restraining elements may be provided at substantially the same vertical height. Further at least three flexible restraining elements may be provided within the receptacle at the same vertical height to each other. However, the further at least three flexible restraining elements may be provided at a different vertical height than the previous at least three flexible restraining elements, e.g., below or above them.

Thus, each receptacle may comprise at least two groups of at least three flexible restraining elements, wherein each group is arranged at substantially the same vertical height within the respective receptacle. The flexible restraining elements may be provided in groups at equidistant positions within the receptacle. For example, one or each group may be provided with three flexible restraining elements, or with six flexible restraining elements. At least three flexible restraining elements, preferably at at least two heights, provide a reliable restraining and holding function for the sample tube within the sample tube rack.

When a sample tube is inserted in the opening from above, the sample tube touches the flexible restraining elements, thereby bending them slightly outwards, in a direction facing radially outwards from the vertical axis through the center of the respective opening. Thereby, the flexible restraining elements are bent outwards and apply a gripping force onto the sample tube. Thus, the sample tube may be steadily held within the respective receiving position of the sample tube rack between the flexible restraining elements.

The flexible restraining elements may be configured such that a sample tube type with the smallest diameter that is supposed to be used with the sample rack is held sufficiently tight within the rack, even when the rack is flipped over. Furthermore, the flexible restraining elements may be configured such that it is possible to insert the sample tube type with the largest diameter without problem. Also, the flexible restraining elements may be configured such that a robotic gripper may be able to remove any type of sample tube from the rack without problem.

The flexible restraining elements may be configured such that the main weight of the sample tube and their content is held by the flexible restraining elements and not by the supporting position. The rack may be configured such that the sample tubes may be placed in the rack such that the bottom of the sample tubes will make contact with a bottom of the receptacle. Some sample tubes may be just fixed via the elastic fingers, having scarcely or no contact with the supporting surface.

By providing at least three flexible restraining elements, the sample tube may also be aligned in a predetermined position within the upper opening, e.g. at a receiving position. The flexible restraining elements enable arrangement of sample tubes with different diameter within the sample tube rack.

The sample tube rack according to the third aspect may comprise some features of the sample tube rack according to the first aspect, in particular a gripping orifice, a thumb rest feature, a lift-of prevention feature, an RFID-tag receiving area, an alignment feature, etc.

Figure 2:
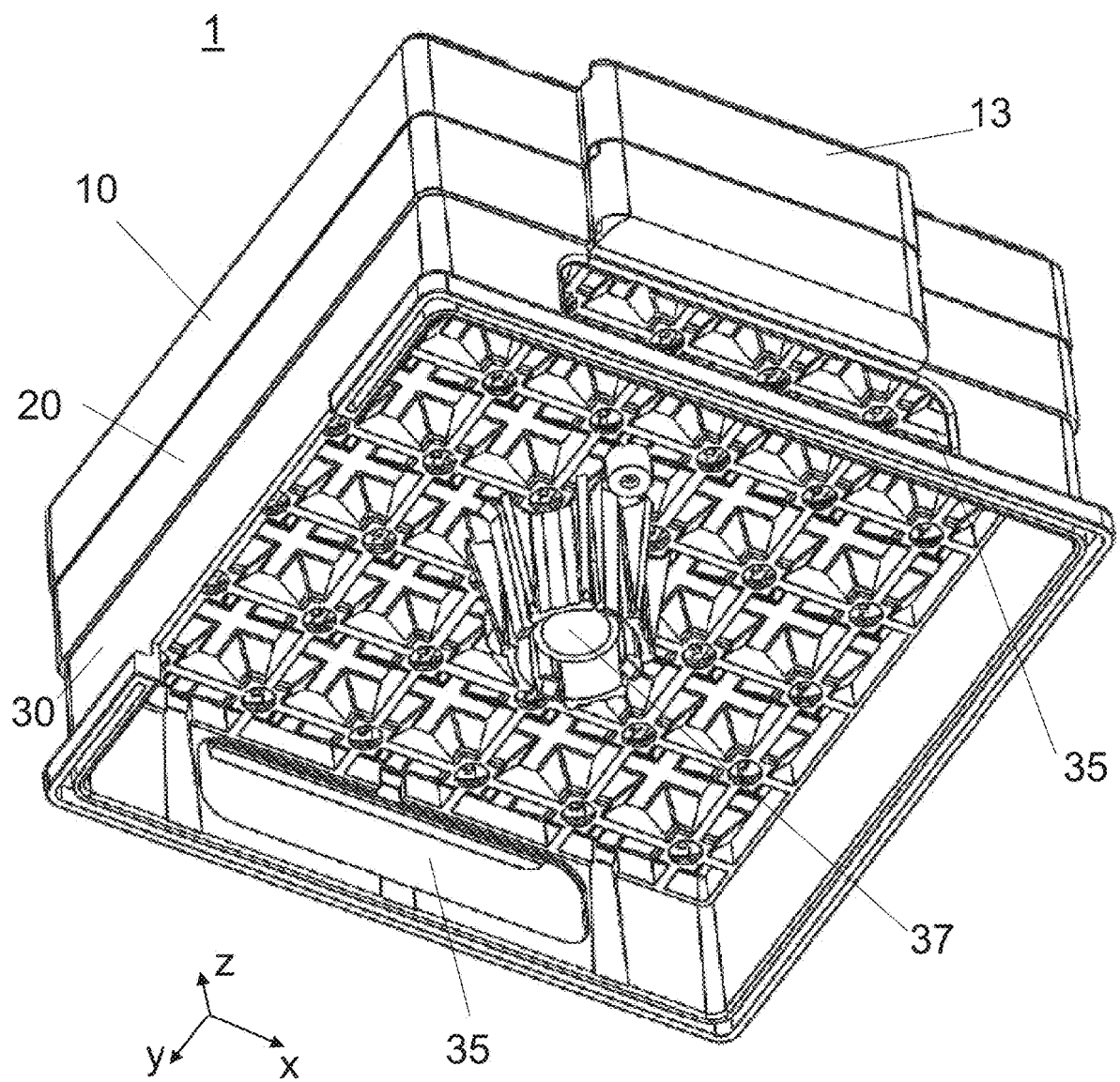
Figure 3:
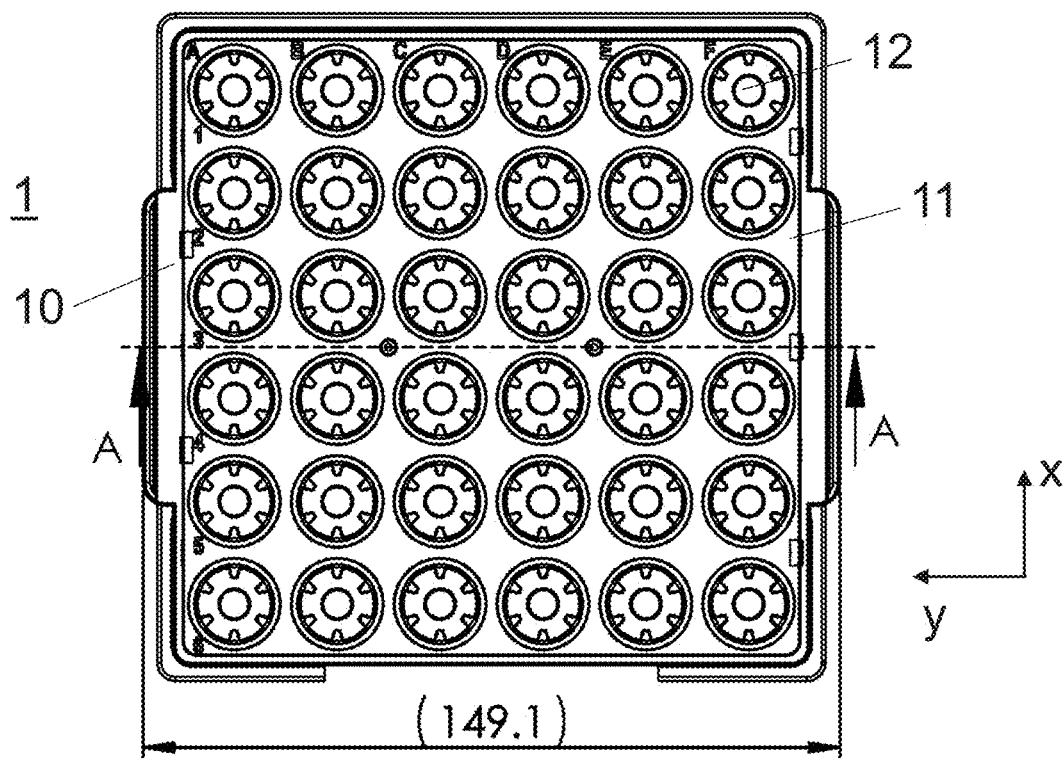
Figure 4:
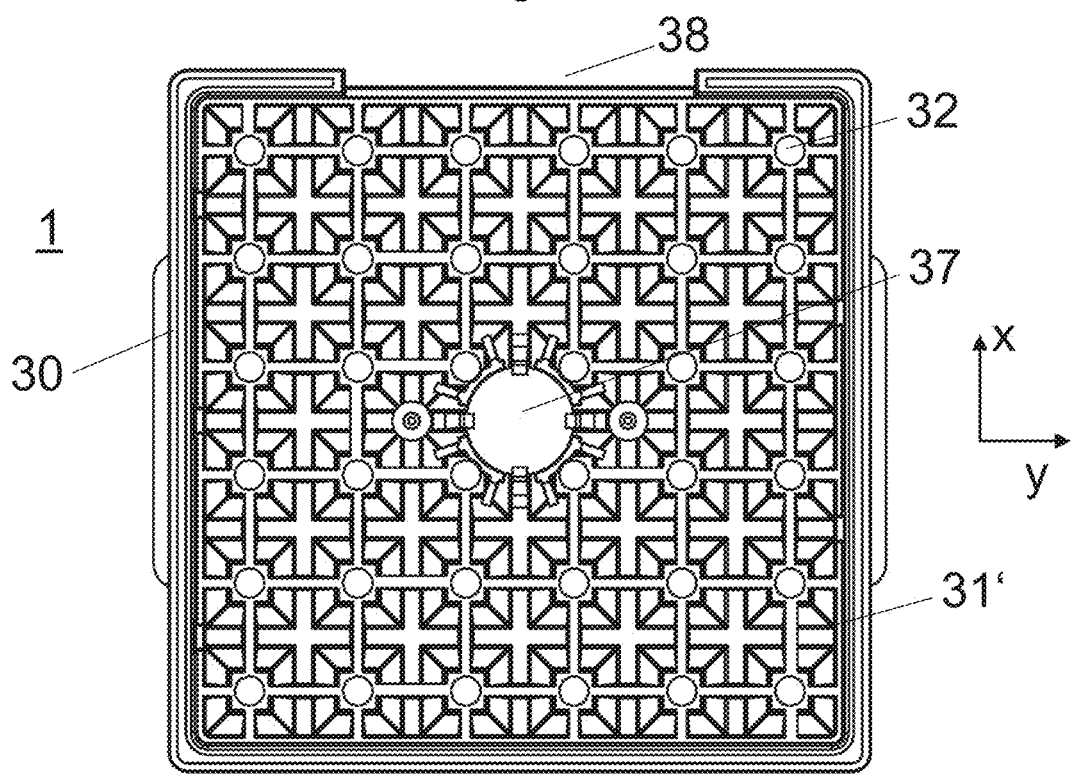
Figure 5:
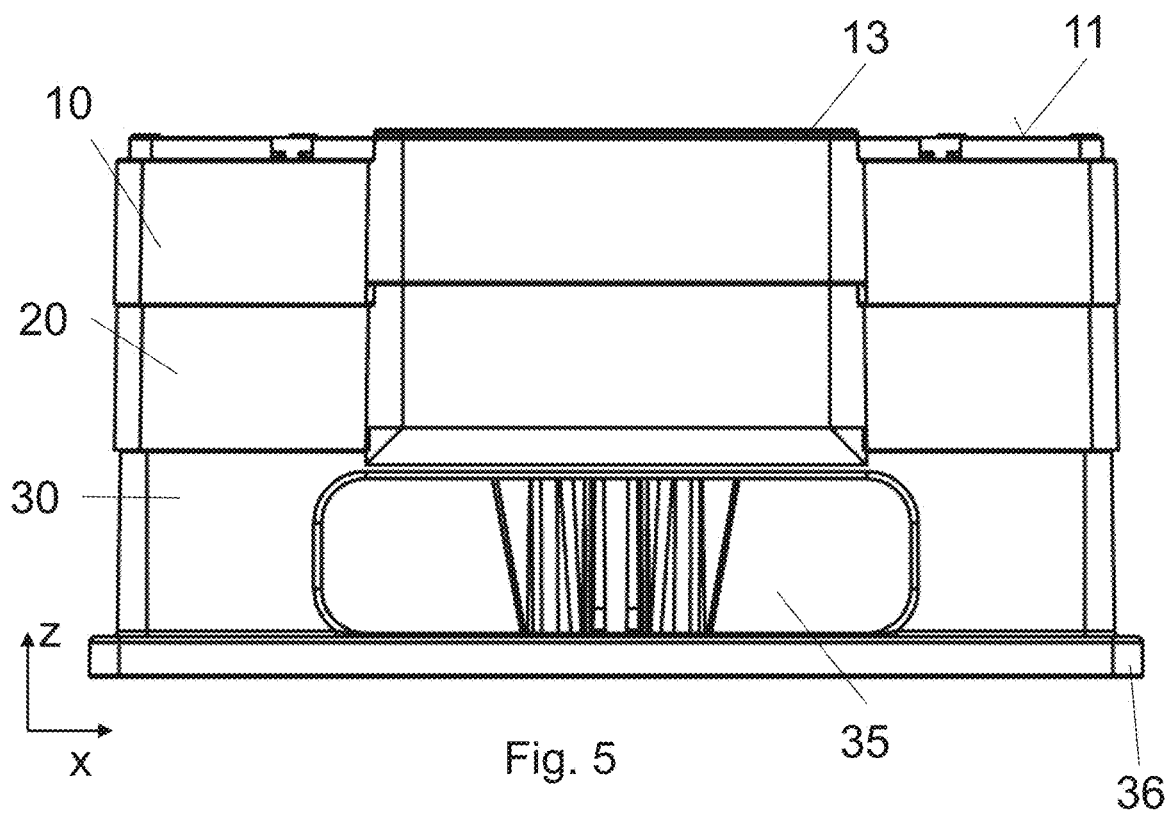
Figure 6:
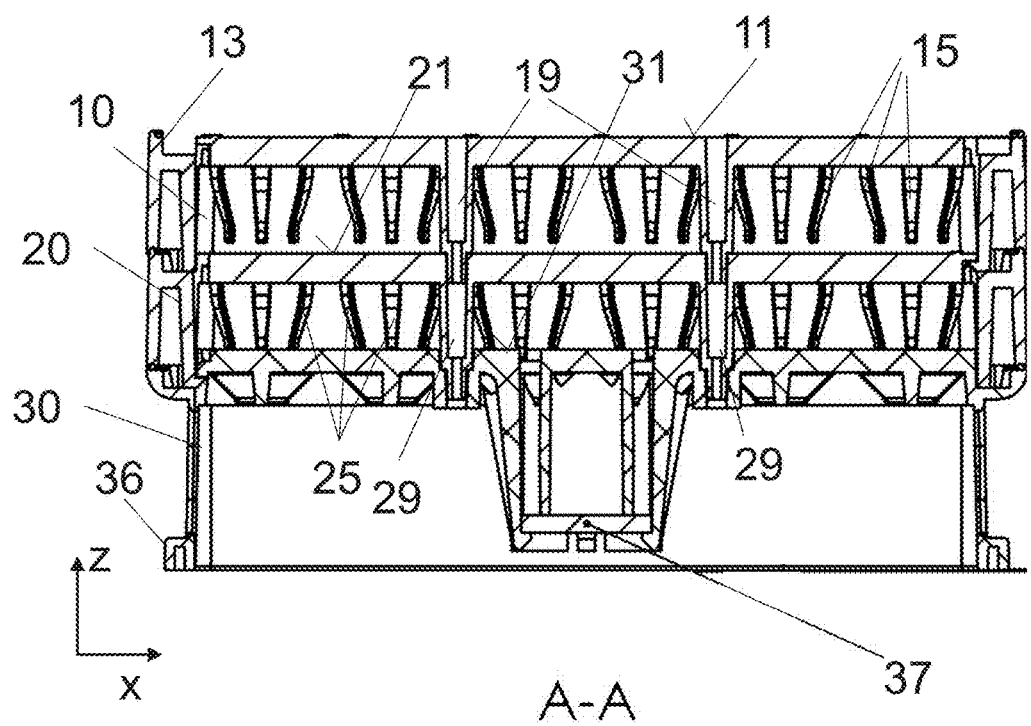
Figure 7:
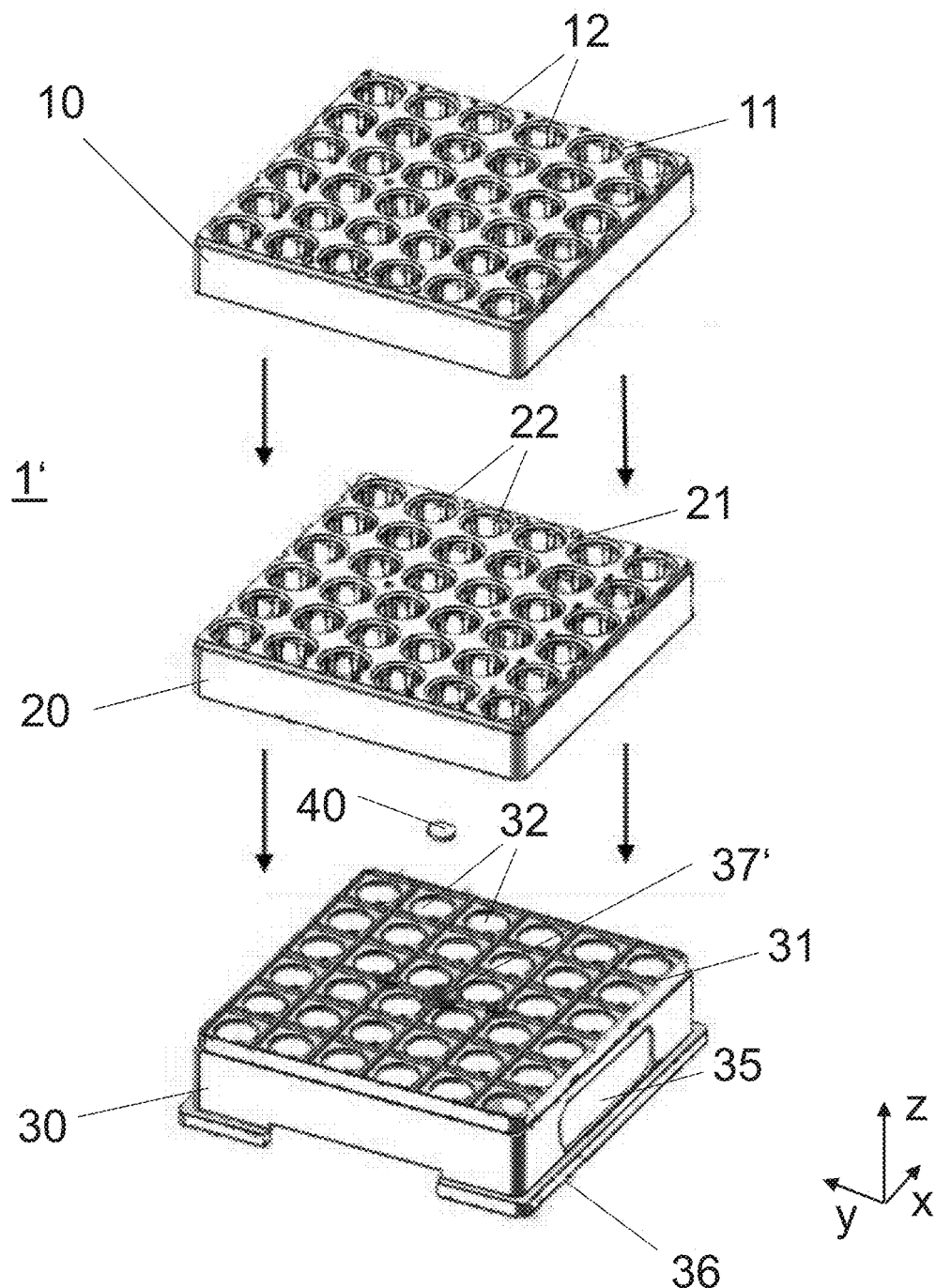
Figure 8A:
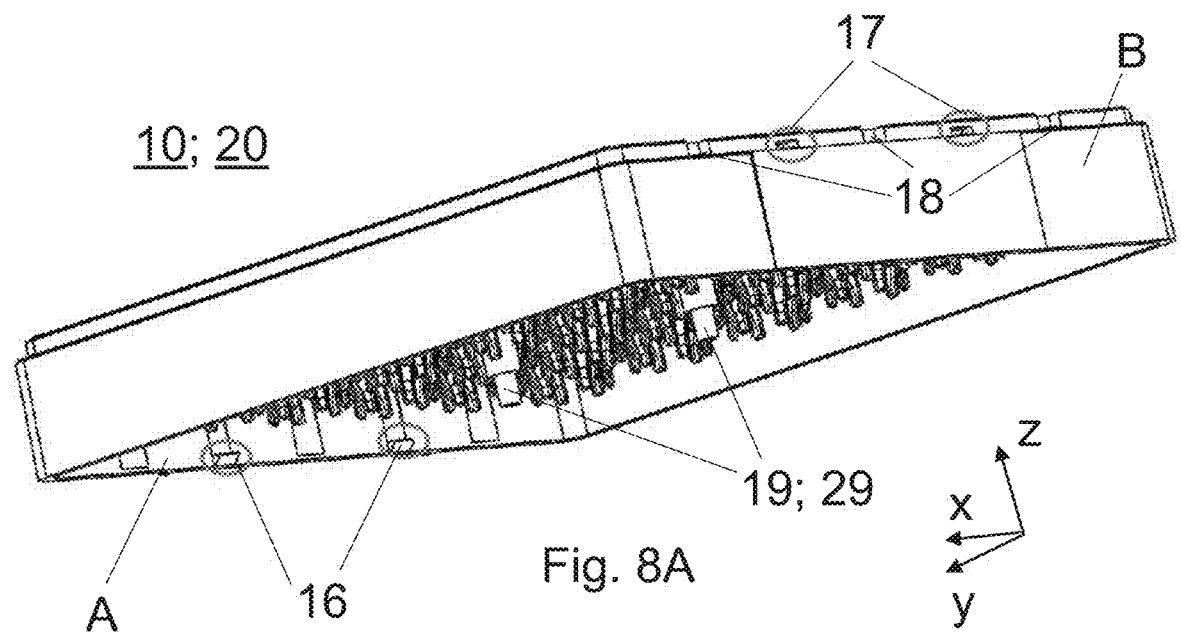
Figure 8B:
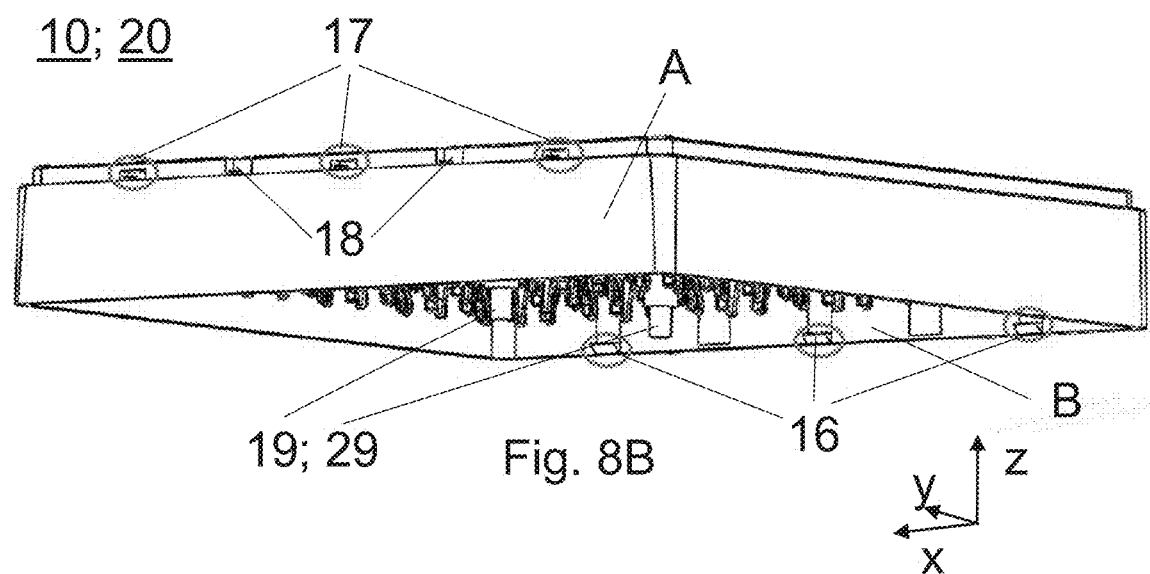
Figure 9A:
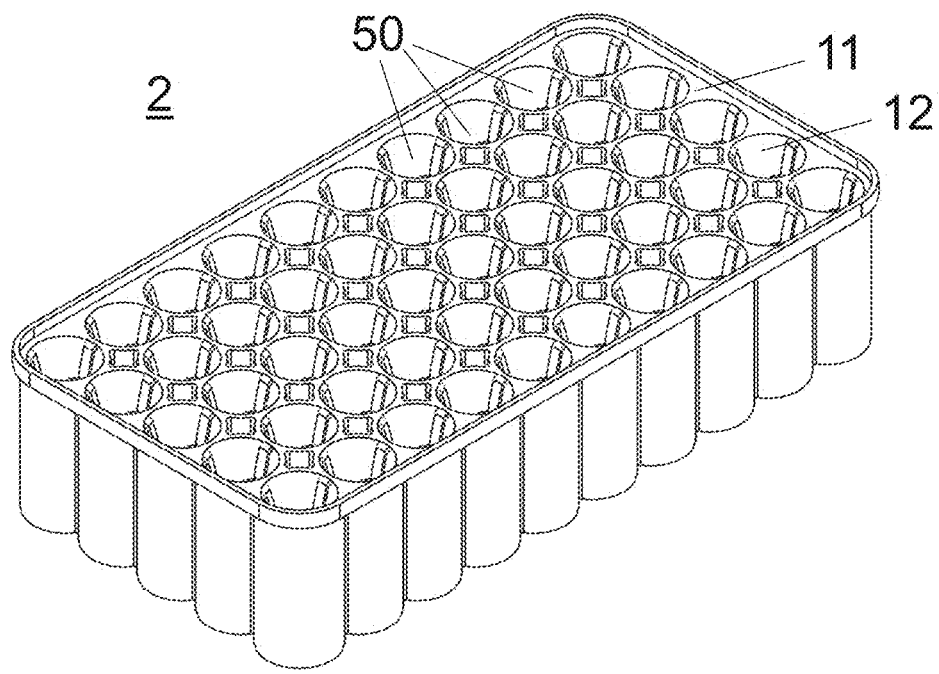
Figure 9B:
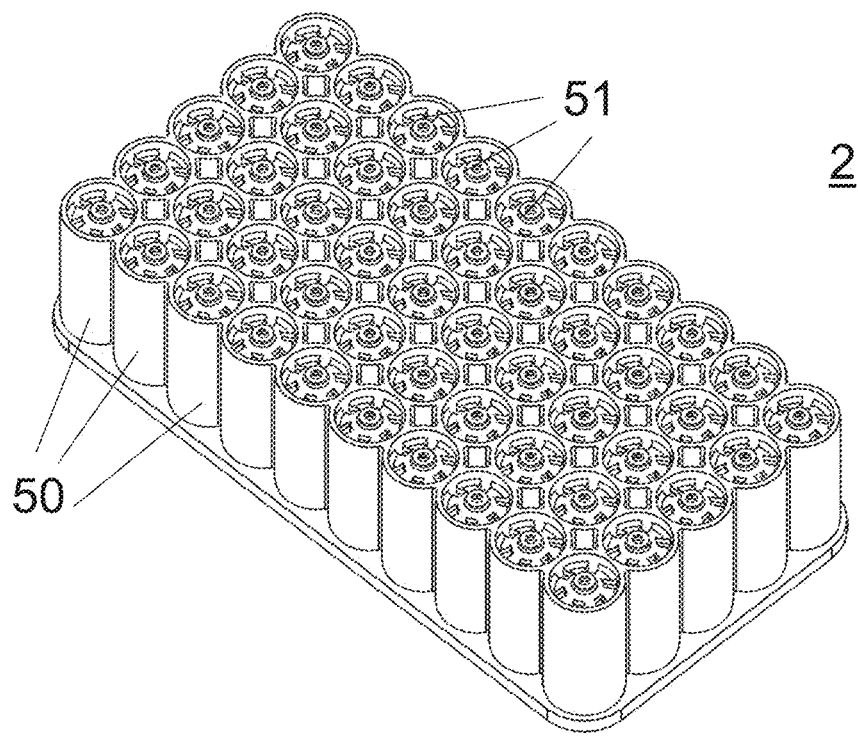
Figure 10A:
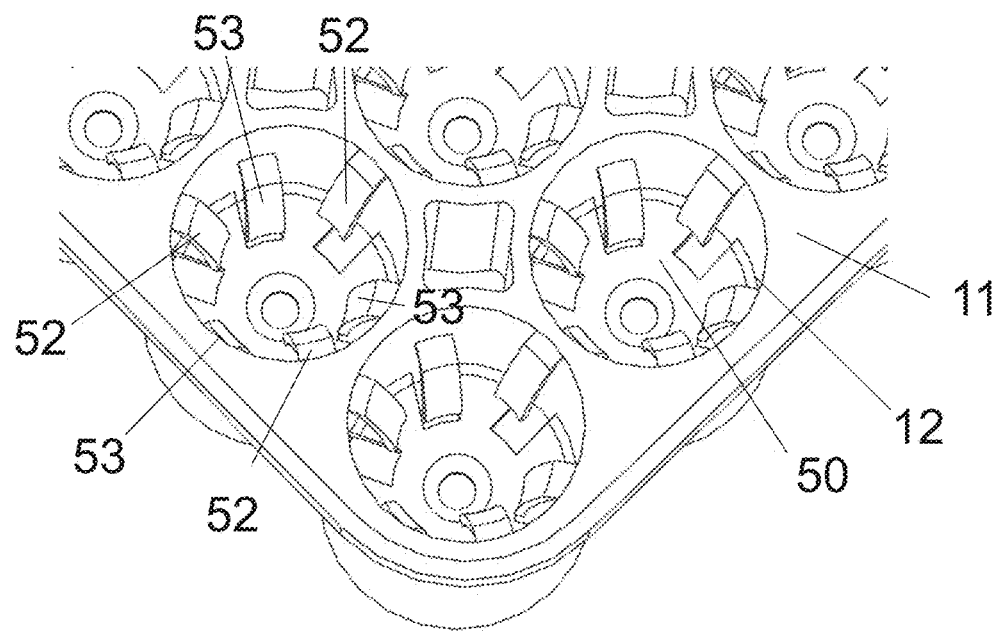
Figure 10B:
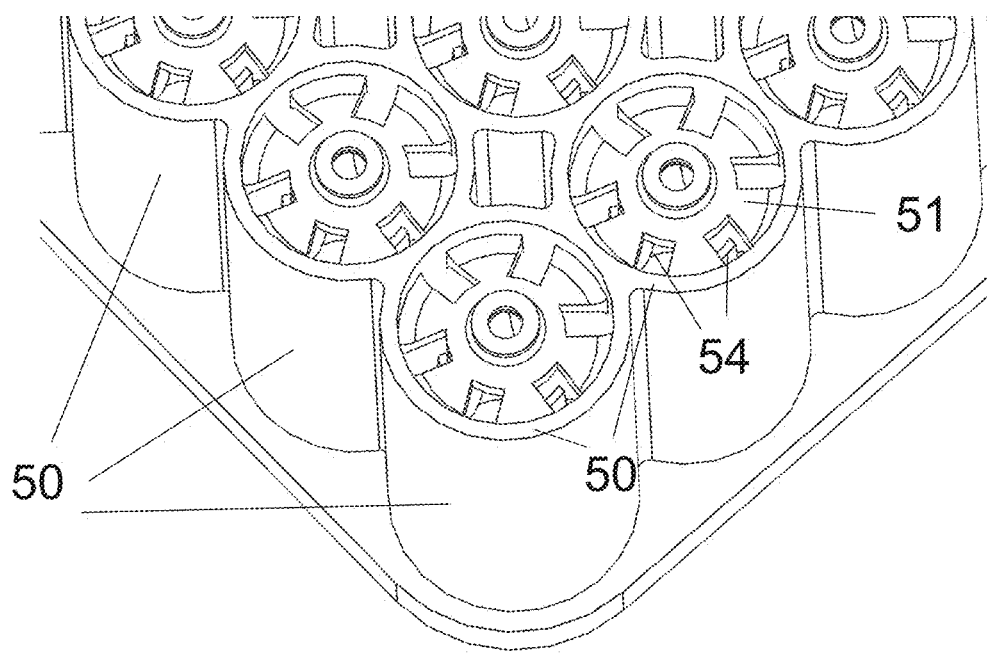
Figure 11A:
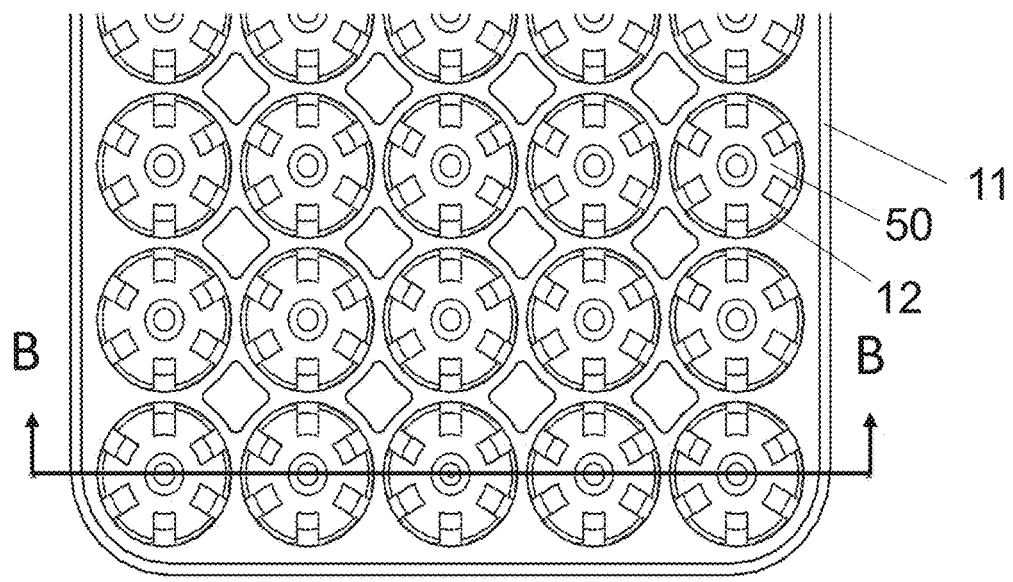
Figure 11B:
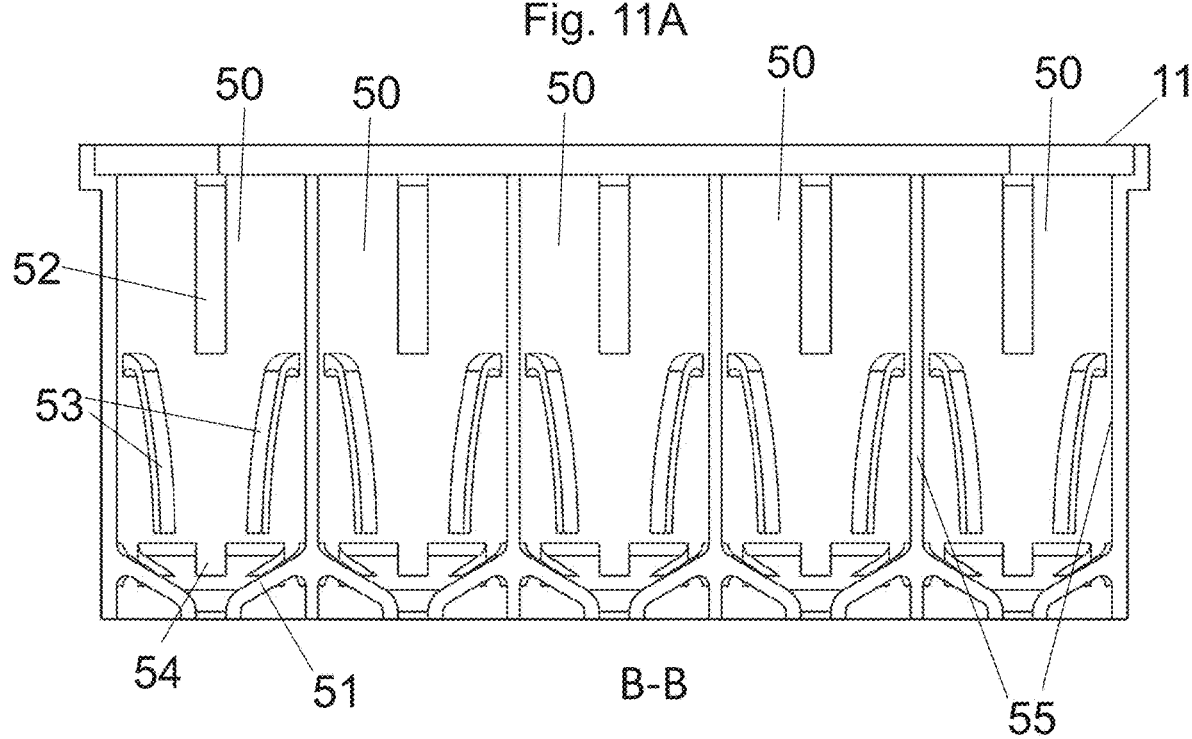

Embodiments of the invention are described with reference to the figures. Features of the embodiments shown in the figures may be combined with alternative embodiments. Reference numbers identify identical or similar features of different embodiments. The embodiments are shown by:

FIG. 1 a perspective view from above a sample tube rack;

FIG. 2 a perspective view from below the sample tube rack;

FIG. 3 a view from above the sample tube rack;

FIG. 4 a view from below the sample tube rack;

FIG. 5 a side view of the sample tube rack;

FIG. 6 a cross section of the sample tube rack;

FIG. 7 a perspective, exploded view of a sample tube rack;

FIG. 8A a perspective view of an upper part of a sample tube rack from a first direction;

FIG. 8B a perspective view of an upper part of a sample tube rack from a second direction;

FIG. 9A a perspective view from above a one-piece sample tube rack;

FIG. 9B a perspective view from below the one-piece sample tube rack;

FIG. 10A a perspective view from above a section of the one-piece sample tube rack;

FIG. 10B a perspective view from below a section of the one-piece sample tube rack;

FIG. 11A a view from above onto a section of the one-piece sample tube rack; and FIG. 11B a cross section of the one-piece sample tube rack.

FIG. 1 shows a perspective view of a sample tube rack 1. The sample tube rack 1 is configured to hold, align, receive, and/or retain one or more sample tubes. The sample tube rack 1 comprises three parts: an upper part 10, an intermediate part 20, and a lower part 30. The sample tube rack 1 may substantially consist of these three parts. The sample tube rack 1 is arranged in the reference system of the Earth, indicated in FIG. 1 as a Cartesian coordinate system. Therein, the z-axis is arranged in a vertical direction, and both the x- and the y-axis are arranged in a horizontal plane. Within the reference system of the Earth, the upper part 10 is arranged above the intermediate part 20 which is arranged above the lower part 30. The intermediate part 20 is sandwiched between the upper part 10 and the lower part 30.

The sample tube rack 1 is shaped substantially like a cuboid comprising four lateral walls, one upper side, and one lower side at its base. Furthermore, each of the upper part 10, the intermediate part 20, and the lower part 30 is substantially shaped like a smaller cuboid. Said three smaller cuboids are arranged on top of each other, thereby forming the larger cuboid of the whole sample tube rack 1.

As shown in the exploded view of FIG. 7, the upper part 10, the intermediate part 20, and the lower part 30 are provided as separate components that are shown in an assembled state in FIG. 1. The upper part 10 comprises an upper surface 11 facing in a direction away from the intermediate part 20. The upper surface 11 faces upwards in a vertical direction. The upper surface 11 is substantially planar, and is arranged in a horizontal (x-y-) plane.

A plurality of upper openings 12 are provided in the upper surface 11. In the embodiment shown in FIG. 1, the upper surface 11 comprises 6×6=36 upper openings 12. The upper openings 12 are arranged in a grid, the grid comprising six upper openings 12 in each row aligned along the x-axis and six upper openings 12 in each column aligned along the y-axis. In alternative embodiments, the upper surface may comprise a different number of rows and columns of upper openings 12.

Each upper opening 12 is shaped substantially circular and forms a rim 14 at the intersection with the upper surface 11. The inner diameter of the upper openings 12 is slightly larger than the outer diameter of the largest sample tube the sample tube rack 1 is configured to receive. Each of the upper openings 12 faces upwards and is configured to receive the bottom and/or base of a sample tube that may be inserted into the upper opening 12 in a substantially vertical position. Such a sample tube may be inserted into one of the upper openings 12 until at least the lower third of the sample tube is substantially inserted into the sample tube rack 1. An upper end of the sample tube may then protrude out of the sample tube rack 1 and out of the upper opening 12.

FIG. 7 shows that the upper part 10 and the intermediate part 20 are identical in construction. Thus, the intermediate part 20 comprises an intermediate surface 21 corresponding to the upper surface 11 and a plurality of intermediate openings 22 corresponding to the upper openings 12. A sample tube inserted bottom first into one upper opening 11 is inserted into the sample tube rack until it reaches one of the second openings 22. The sample tube may be further inserted into the second opening 22 until it abuts—bottom first—one of a plurality of supporting positions 32 provided in a supporting surface 31 of the lower part 30. Thus, the sample tube will be held from lateral sides within one of the upper openings 12, one of the intermediate openings 22, and it will be supported by one of the supporting positions 32 that may be formed as a recess within the supporting surface 31.

Referring back to FIG. 1, the construction and shape of the lower part 30 differs from the construction and shape of the intermediate part 20 and of the upper part 10. The lower part 30 is shaped substantially like a cuboid. Furthermore, the lower part 30 comprises at least one gripping orifice 35 provided in a lateral wall and/or side of the lower part 30. The lateral wall and/or side of the lower part 30 refers to one of the (in the embodiment shown in FIG. 1) four lateral walls that limit the extension of the lower part 30 in any horizontal direction. In the embodiment shown in FIG. 1, the gripping orifice 35 allows access in a carrying-space arranged within the lower part 30.

FIG. 2 shows the sample tube rack 1 in a perspective view from below. The lower part 30 comprises a total of two gripping orifices 35 in opposing lateral walls of the lower part 30. Each gripping orifice 35 allows lateral access to a carrying-space arranged below the supporting surface 31 of the lower part 30. A user may insert one or all of his fingers (excluding his thumb) into said carrying space and support the total weight of the sample tube rack together with inserted sample tubes, if applicable, on his finger(s). Since the carrying-space is arranged below the supporting surface 31, no finger of the user will interfere with the arrangement of any tubes inserted into the sample tube rack 1. Preferably, the sample tube rack 1 is configured such that his fingers will not even touch any sample tube when carrying the sample tube rack 1.

When carrying the sample tube rack 1, the user may rest his thumb on a thumb rest feature 13 (see also FIG. 1). The thumb rest feature 13 is provided as lateral protrusion and is arranged above each gripping orifice 35. In the embodiment depicted in the figures, both the intermediate part 20 and the upper part 10 comprise a thumb rest feature, since both parts are identical in construction. However, in a different embodiment, only one thumb rest feature 13 may be sufficient to support the thumb of the user. The thumb rest feature 13 enables resting the thumb of the user, while at least one or all of his other fingers of the same hand are engaged in the gripping orifice 35. The thumb rest feature 13 is provided as a protrusion in a lateral direction, e.g. in the y-direction. Its predominant extension is arranged parallel to the x-axis.

Without the thumb rest feature 13, the user is likely to rest his thumb up on the upper surface 11. While this may cause no problem in case the adjacent upper openings 12 are not filled by a sample tube, it may be uncomfortable, not sterile, and/or hazardous to place the thumb on top of the upper surface 11 if the adjacent openings are filled by sample tubes. Therefore, the thumb rest features 13 increases safety when handling, in particular when carrying, the sample tube rack 1. The thumb rest features 13 are designed sufficiently small to be not in the way of other racks when placed in an input area, e.g. a rack resting area, of a sample tube analyzing system.

FIG. 2 further shows that the lower part 30 comprises an RFID-tag receiving area 37 below the supporting surface 31. The RFID-tag receiving area 37 is provided as protrusion extending downwards comprising an area wherein an e.g. substantially disc shaped RFID-tag may be clipped into, e.g. from below. The RFID-tag may be used to identify the rack 1 by use of an RFID-tag reader. When the sample tube rack 1 is arranged on top of a rack resting area, the RFID-tag receiving area 37 in the lower part 30 will be arranged close to the rack resting area. Thereby, an RFID-tag reader within the rack resting area allows automatic identification of the sample tube rack 1 above said reader.

FIG. 3 shows a top view onto the upper surface 11 of the sample tube rack 1. As shown in FIG. 3, the upper surface 11 is substantially square. However, the upper surface 11 may be shaped differently, e.g. rectangular, and may then comprise, e.g., 2×6 upper openings 12, or 12×6 upper openings 12, or the like. FIG. 3 also shows the length of the extension of the sample tube rack 1 in the y-direction as 149.1 mm. However, said length, as other dimensions shown in the figures, merely illustrates an exemplary dimension of one embodiment of the sample tube rack 1.

The upper part 10 may comprise an index similar to a checkerboard, showing numbers on one side and letters on an adjacent side. In the shown embodiment, the index shows the number 1 to 6 on one lateral side, and the letters A to F on an adjacent lateral side.

FIG. 4 shows a view from below onto the lower side of the lower part 30. Therein, the RFID-tag receiving area 37 is arranged substantially in the center of the lower part 30 when viewed upon from below. As shown in FIG. 4, the number of supporting positions 32 is the same as the number of upper openings 12. Also shown in FIG. 4 is an underside 31' of the supporting surface 31 of the lower part 30. While each of the first surface 11, the intermediate surface 21, and the supporting surface 31 faces upwards, the underside 31' of the supporting surface 31 faces downwards against the direction of the z-axis. When a user carries the sample tube rack 1, his fingers may touch the underside 31' of the supporting surface.

FIG. 5 shows a side view of the sample tube rack 1 in the direction of the y-axis. The gripping orifice 35 is provided in a lateral wall and encompassed from all sides by at least a portion of the lower part 30, thereby forming an enclosure surrounding the gripping orifice 35. Thereby, the stability of the whole sample tube rack is improved. Furthermore, a balanced carrying of the sample tube rack 1 is enabled.

The lower part 30 comprises a lift-off prevention feature 36. The lift-off prevention feature 36 is provided as a protrusion at the lowest end of the lower part 30, e.g., a base of the lower part 30. The lift-off prevention feature 36 protrudes in the x-axis direction, in the y-axis direction, against the x-axis direction, and against the y-axis direction from the lateral wall of the lower part 30, e.g. from its base. The shape of the lift-off prevention feature 36 is also shown in, e.g., FIG. 1 and FIG. 7. When the sample tube rack 1 is inserted into a sample tube analyzing system, a complementary restraining feature of the analyzer may interact with the lift-off prevention feature 36 so that a vertical movement of the sample tube rack in vertically upwards direction is inhibited. This may be accomplished by providing a complementary protrusion in the analyzing system inhibiting the movement of the sample tube rack 1 upwards.

FIG. 6 shows a cross section along a plane A-A shown in FIG. 3 as a dashed line. In the assembled state of the sample tube rack 1, the upper surface 11, the intermediate surface 21, and the supporting surface 31 are arranged parallel to each other, e.g. equidistantly from each other, in substantially horizontal planes.

Each of the upper openings 12 and the intermediate openings 22 comprises flexible restraining elements. Upper restraining elements 15 are protruding substantially downwards from the first surface 11. Intermediate restraining elements 25 are protruding substantially downwards from the intermediate surface 21. Each upper opening 12 comprises six upper restraining elements 15. Each intermediate opening 22 comprises six intermediate restraining elements 25. Six restraining elements per opening provide comfortable support for a sample tube inserted into any of the openings. However, in alternative embodiments, a different number of restraining elements per opening may be provided. For example, each opening could be provided with a minimum of three restraining elements and still provide comfortable and steady support for a sample tube. However, six restraining elements per opening may be especially stable and preferable.

FIG. 6 shows that the area between the upper surface 11 and the intermediate surface 21 is substantially wall-free. Also, the area between the intermediate surface 21 and the supporting surface 31 is substantially wall-free. Walls are provided only at the lateral ends of the sample tube rack 1, along which the three parts of the sample tube rack 1 are connected to each other. However, in between said walls, further inside the sample tube rack 1, no further walls are required to ensure sufficient stability of the rack.

As shown in FIG. 6, the thumb rest feature 13 comprises a hollow core which reduces the weight of the sample tube rack as well as the material needed to form the thumb rest feature 13 while providing sufficient stability.

FIG. 6 shows that the three parts are stacked on top of each other. The sample tube rack 1 is constructed so that not only the three parts are stackable on top of each other, but also the sample tube rack 1 is stackable on top of an identical further sample tube rack 1. To enable said stackability of the sample tube rack 1, the upper surface 11 is slightly smaller than the inside of the base and/or lowest portion of the lower part 30. The base of the lower part 30 may be formed as receiving position for the upper surface 11 of an identical sample tube rack.

FIG. 6 also shows exemplary dimensions in millimeters of one embodiment.

The intermediate part 20 is connected to the upper part 10 via connecting features 19. The intermediate part 20 is connected to the lower part 30 by connecting features 29. Said connecting features 19 and 29 enable a plug connection between the respective parts. The plug connection may be of a kind that is only unpluggable by use of a specific tool, and that is manually unpluggable. The connecting features 19 and 29 may be provided as elongated sticks protruding from the respective surface downwards and towards the surface arranged below the respective part.

FIG. 7 shows an exploded view of a sample tube rack 1'. Therein, the same reference signs as used previously identify the same or similar parts of the sample tube rack 1'. In the embodiment shown in FIG. 7, the upper part 10 and the intermediate part 20 comprise no thumb rest feature. However, as before, both parts are identical in construction. Furthermore, the lower part 30 comprises another embodiment of an RFID-tag receiving area 37'. Said RFID-tag receiving area 37' is provided as a recess in the supporting area 31 to receive an RFID-tag 40 from above.

The exploded view shown in FIG. 7 shows the components of the sample tube rack 1' before the assembly. The sample tube rack may be assembled by moving the parts along the arrows shown in FIG. 7.

The sample tube rack may consist of only the lower part, the intermediate part, and the upper part. Furthermore the sample tube rack may comprise an RFID-tag. However, only said three parts are required to enable safe receipt of one or more sample tubes.

All three parts 10, 20, and 30 may be provided as injection molding parts. In the assembled state of the sample tube rack, all three parts are snapped together. The RFID-tag may simply be assembled by snapping it into the RFID-tag receiving area 37, or by inserting it into the RFID-tag receiving area 37' before assembly of the whole rack.

Furthermore, on a lateral wall of any of the three parts, e.g. of the upper part 10, a bar code comprising an identification information, e.g. a serial number, may be provided. Said identification information may correspond to an information stored in the RFID-tag 40. In the RFID-tag 40, e.g. the rack geometry may be saved (like a number of rows and columns, length, height, etc.). A grip angle for a robot for the rack type may be saved, and/or an insertion force of the robot for this rack type may also be saved. These data may be read by an RFID-tag reader and used by a robot of a sample tube analyzing system.

The gripping orifice 35, if applicable in connection with a thumb rest feature 13, may enable safe one-hand handling of the sample tube rack 1. Since the gripping orifice 35 is cut out from a lateral wall of the lower part 30, while still comprising a full circumference, a base area of the gripping orifice 35 may provide a counterforce when handling the sample tube rack. As the users fingers are enclosed by the gripping orifice 35 from all sides, the sample tube rack 1 could even be flipped over without the user losing control and/or grip of the sample tube rack 1.

In the lower rim of the lower part 30, e.g. in its base, the lift-off prevention feature 36 may be provided. Furthermore, in said base of the lower part 30, a gap 38 (see FIGS. 1 and 4) may be provided as a positioning feature. Said gap 38 may be provided in only one of the four lateral walls of the lower part 30 to provide an asymmetry at the base of the sample tube rack 1. Said asymmetry, namely the positioning feature, enables a mechanical coding to avoid a wrong insertion of the sample tube rack 1 onto or into a rack resting area. In an alternative embodiment, the rack may comprise two or more gaps as positioning feature identifying a rotational orientation of the sample tube rack.

The arrangement of the positioning feature may correspond to the index of the upper part 10 (see FIG. 3) to correctly indicate the orientation of the sample tube rack 1.

The flexible restraining elements 15 and/or 25 may be configured to hold sample tubes with a diameter from substantially 12 mm to 16 mm. In an alternative embodiment, the flexible restraining elements may be configured to hold sample tubes with a diameter from substantially 5 mm to 10 mm. A sample tube may be inserted into the sample tube rack for at least 30 mm of its length, preferably for at least 45 mm of its length to enable safe storing and/or receiving of the sample tube.

FIGS. 8A and 8B show a perspective view on an upper part 10 of a sample tube rack 1, each from a different direction. At two opposite lateral walls A and B, the upper part 10 comprises a plurality of connecting elements that enable a plug-connection and/or a snap-in connection between the upper part 10 and the intermediate part 20. Since the intermediate part 20 is designed identical to the upper part 10, said connecting elements of the intermediate part 20 also enable a plug-connection and/or a snap-connection between the intermediate part 20 and both the upper part 10 and the lower part 30.

The connecting elements include snap-in noses 16, snap holes 17, and no-snap holes 18. The connecting elements are arranged asymmetrical within the upper part 10 to enable identifying of the orientation of the upper part 10 (and also of the identical intermediate part 20).

On the inside of a lower end of a first lateral wall A, the upper part 10 comprises two snap-in noses 16 (see FIG. 8A). On the inside of a lower end of a second lateral wall B, the upper part 10 comprises three snap-in noses 16 (see FIG. 8B). The first lateral wall A is arranged opposite to the second lateral wall B of the upper part 10. All snap-in noses 16 are arranged distant from each other.

At an upper end of the first lateral wall A, the upper part 10 comprises three snap-in holes 17, in between which two no-snap holes 18 are arranged (see FIG. 8B). At an upper end of the second lateral wall B, the upper part 10 comprises three no-snap holes 18, in between which two snap-in holes 17 are arranged (see FIG. 8A).

The intermediate part 20 is designed identical to the upper part 10 and, thus, comprises the same number of snap-in noses 16, snap holes 17, and no-snap holes 18. In an assembled state of the sample tube rack 1, the two snap-in noses 16 of the first wall A of the upper part 10 are snapped into the two snap-in holes 17 of the second wall B of the intermediate part 20. Also, the three snap-in noses 16 of the second wall B of the upper part 10 are snapped into the three snap-in holes 17 of the first wall A of the intermediate part 20.

When the first wall A of the upper part 10 is arranged above the first wall A of the intermediate part 20, the two snap-in noses 16 of the first wall A of the upper part 10 would be inserted into the two no-snap holes 18 of the first wall A of the intermediate part 20. Thus, no snap-connection is established, since the snap-in noses 16 may not be interlocked in a snap-connection with the no-snap holes 18.

The snap-connection of the intermediate part 20 and the upper part 10 may only be established under one specific, predetermined orientation of said two parts. The snap-connection may be configured to be established manually.

The lower part 30 may comprise corresponding snap-in holes 17 and/or corresponding no-snap holes 18 arranged at the upper end of two of its opposing lateral walls to engage into the snap-in noses 16 of the intermediate part 20. Thus, a snap-connection of the intermediate part 20 and the lower part 30 may also only be established under one specific, predetermined orientation of said two parts.

Each no-snap hole 18 may be arranged above one snap-in nose 16. Each no-snap hole 18 may be provided as a substantially vertical channel connecting the upper surface 11 (or the intermediate surface 21) with the snap-in nose 16 arranged at a lower portion of the upper part 10 (or intermediate part 20).

An exemplary snap-in hole 17 and an exemplary no-snap hole 18 are identified in FIG. 1. While the snap-in holes 17 provide an upper rim for the snap-in nose 16 to snap into, the no-snap holes 18 comprise no such upper rim to grant access for an injection mold tool and to inhibit any snap-connection between the parts not oriented correctly.

FIGS. 8A and 8B also show the connecting features 19 and 29, protruding as pins downwards and out of the lower side of the upper surface/intermediate surface. The connecting features 19, 29 may interact with the other connecting elements/features like the snap-in noses 16, the snap holes 17, and the no-snap holes 18 to establish a steady and safe connection between the parts of the sample tube rack 1.

The arrangement of the connecting elements/features like the snap-in noses 16, the snap holes 17, and the no-snap holes 18 is asymmetrical in each of the upper part 10, the intermediate part 20, and the lower part 30. Distances between said different types of connecting elements/features may be configured such that the upper part 10 can be clipped together with the intermediate part 20, only if the intermediate part 20 is rotated by 180° as compared to the upper part 10.

In an embodiment, the connecting elements/features 16, 17, and/or 18 may also be arranged at the other two lateral walls, at the edges of the respective part, and/or at all four lateral walls. The rack may comprise more or less than five of said connecting elements/features. However, the sample tube rack 1 comprises a minimum of two connecting elements/features on each of two opposing sides/walls.

In an embodiment, the sample tube rack 1 is configured to be unpluggable, even by a tool. Once established, the plug connection between the upper part 10, the intermediate part 20, and/or the lower part 30 may be permanently fixed.

The no-snap holes 18 may be formed by tool inserts of an injection mold tool and enable a safe molding of all parts above and below the respective surface of the respective part. When the upper part 10 and/or the intermediate part 20 is molded, a tool insert for the snap-in noses 16 may be moved parallel to and against the direction of the z-axis (from above) through the no-snap holes 18 to form the snap-in noses 16 into the mold. A tool insert for the snap-in holes 17 may be moved parallel to and in the direction of the z-axis (from below) to form the snap-in holes 17 into the mold. The no-snap holes 18 may have no further function and/or use besides granting the tool inserts of the injection mold tool access into the respective part, and/or an exit out of the respective part.

In other words, the upper part 10 and/or the intermediate part 20 comprise channels for the tool inserts forming the connecting elements/features 16, 17, and 18 that are arranged along the direction in which the plug-in/snap-in connection between said parts is established (here parallel to the z-axis). Thus, no complicated slides in the injection mold tool are required to establish the plug-in/snap-in connection. Thereby, both the molding process and the establishing of the connection between the parts is improved and simplified.

In particular, the parts may be configured to require no sliding element in the injection mold tool to establish the connection between the parts.

FIG. 9A shows a perspective view from above a one-piece sample tube rack 2. The sample tube rack 2 is configured to hold, align, receive, and/or retain one or more sample tubes. The sample tube rack 2 is provided as a single mold. The sample tube rack 2 is arranged in the reference system of the Earth, defining a substantially vertical up and down direction.

The sample tube rack 2 is shaped substantially like a cuboid comprising four lateral walls, one upper side, and one lower side at its base. Therein, the upper side is provided by an upper surface 11. A plurality of upper openings 12 are provided in the upper surface 11. Below each upper opening 12, the sample tube rack 2 comprises a plurality of receptacles 50, each of which is configured to hold, align, receive, and/or retain one sample tube, respectively.

The receptacles are arranged in a grid comprising rows and columns in a horizontal plane. In the embodiment shown in FIGS. 9A and 9B, the sample tube rack 2 comprises 5×10 upper openings 12 and receptacles 50. Thus, the shown sample tube rack 2 is configured to receive, hold and store up to 50 sample tubes. Different one-piece sample racks may comprise a different number of rows and columns of receptacles.

Each receptacle 50 is provided as substantially tubular cavity, accessible via the upper opening 12. The tubular cavities of the receptacles 50 are arranged parallel to each other.

The cylinder axis of each tubular cavity is arranged substantially vertically.

FIG. 9B shows a perspective view from below the one-piece sample tube rack 2. While each receptacle 50 ends at an upper end with the upper opening 12 (FIG. 9A), each receptacle 50 ends at a lower end at a receptacle bottom 51. The receptacle bottom 51 is substantially disc-like shaped and arranged as a cylinder bottom of the tubular cavity. The receptacle bottom 51 may be configured to support the bottom of a sample tube inserted into the according receptacle 50.

FIG. 10A shows a perspective view from above a section of the one-piece sample tube rack 2. Each receptacle 50 comprises a plurality of restraining elements, in particular first restraining elements 52 and second restraining elements 53. In the embodiment shown in the figures, three first restraining elements 52 form a first group of restraining elements and three second restraining elements 53 form a second group of restraining elements. Each receptacle 50 may comprise two or more groups of restraining elements, each group comprising three or more restraining elements. Preferably, two groups of restraining elements comprise three restraining elements, respectively.

FIG. 11B shows a cross section of the one-piece sample tube rack 2 through a vertical plane B-B. The vertical plane B-B is identified in FIG. 11A showing a view from above onto a section of the one-piece sample tube rack 2.

FIG. 11B shows the cross section through a row of five receptacles 50 arranged adjacent to each other in a horizontal direction. The receptacles 50 are separated from each other by walls 50. The walls 50 form the tubular cavities of the receptacles 50 and are arranged substantially vertical.

As shown in FIG. 11A, each receptacle 50 comprises six restraining elements, all of which are arranged substantially equidistantly to each other along the circumference of the tubular cavity when view from above.

The cross section of FIG. 11B shows that the three first restraining elements 52 are arranged above the three second restraining elements 53. While the first restraining elements 52 are attached to the walls of each receptacle 50 near the upper surface 11, the second restraining elements 53 are attached to the walls of the receptacle 50 deeper within the receptacle 50, e.g. near the vertical middle of the receptacle 50.

Because the restraining elements are grouped as described above in the first group comprising the first restraining elements 52 and the second group comprising the second restraining elements 53, the restraining elements may hold sample tubes comfortably stable within each receptacle 50.

FIG. 10B shows a perspective view from below a section of the one-piece sample tube rack 2. Each receptacle bottom 51 comprises a plurality of slots 54 arranged along the circumference of each receptacle. Each slot 51 grants access (e.g. in a vertical direction from below the sample tube rack 2) for a tool insert forming the restraining elements 52 and 53 when molding the one-piece sample tube rack 2. The first and the second restraining elements 52 and 53 are arranged alternating sequentially along the circumference of the tubular receptacle 50, and not above each other. Thus, each restraining element may be formed individually in a single mold, wherein the slots 54 provide sufficient access to the required tool inserts.

Furthermore, the slots 54 and, if applicable, further holes in the receptacle bottom 51, provide a drainage for fluids, e.g., water condensation on the sample tubes.

The walls 50 protrude over receptacle bottoms 51 to form a stable support for the sample tube rack 2 (see also FIG. 11B). Besides the protruding walls 50, a further support may be provided by a circular ring formed around the middle of each receptacle bottom 51 forming the lowest portion of each receptacle 50.

The one-piece sample tube rack 2 may be configured to be stackable on top and/or below an identical further one-piece sample tube rack.

LIST OF REFERENCE NUMERALS 1 sample tube rack
1' sample tube rack
2 sample tube rack
10 upper part
11 upper surface
12 upper opening
13 thumb rest feature
14 rim
15 upper restraining elements
16 snap-in nose
17 snap hole
18 no-snap hole
19 connecting feature
20 intermediate part
21 intermediate surface
22 intermediate opening
25 intermediate restraining elements
29 connecting feature
30 lower part
31 supporting surface
31' underside of the supporting surface
32 supporting position
35 gripping orifice
36 lift-off prevention feature
37 RFID-tag receiving area
37' RFID-tag receiving area 38 gap
40 RFID-tag
50 receptacle
51 receptacle bottom
52 first restraining element
53 second restraining element
54 slot
55 wall
A first lateral wall
B second lateral wall

What is claimed is:

1. A sample tube rack for receiving at least one sample tube, the sample tube rack comprising:
   an upper part comprising an upper surface and first walls extending around the upper surface to an upper part end defining an upper part end rim opposite the upper surface, the first walls extending in a non-parallel direction to the upper surface, wherein at least one upper opening for receiving the at least one sample tube is provided in the upper surface;
   an intermediate part comprising an intermediate surface and second walls extending around the intermediate surface to an intermediate part end defining an intermediate part end rim opposite the intermediate surface, the second walls in a non-parallel direction to the intermediate surface, wherein at least one intermediate opening for receiving the at least one sample tube is provided in the intermediate surface; and
   a lower part comprising a supporting surface and third walls extending around the supporting surface and in a non-parallel direction to the supporting surface, wherein at least one supporting position for supporting the at least one sample tube is provided in the supporting surface;
   wherein the intermediate surface of the intermediate part is connected to the first walls of the upper part such that the entire upper part end rim contacts the intermediate part and the second walls of the intermediate part are connected to the supporting surface of the lower part such that the entire intermediate part end rim contacts the lower part, and wherein the at least one upper opening is substantially aligned above the at least one intermediate opening and above the at least one supporting position for receiving the at least one sample tube, and
   wherein at least one gripping orifice is provided through at least one of the third walls of the lower part, wherein the at least one gripping orifice comprises a full circumference provided by the lower part.

2. The sample tube rack of claim 1, wherein at least one of the third walls with the at least one gripping orifice is at least one of:
   arranged adjacent to the supporting surface;
   or at an angle different from 0° and 180° to the supporting surface.

3. The sample tube rack of claim 1, wherein the at least one gripping orifice is configured to enable lateral access into a carrying-space below the supporting surface.

4. The sample tube rack of claim 1, further comprising a thumb rest feature arranged above the at least one gripping orifice, wherein the thumb rest feature includes a lateral protrusion extending from at least one of the first walls of the upper portion, the upper part end rim, at least one of the second walls of the intermediate portion, and the intermediate part end rim, the at least one first wall adjacent to the at least one second wall.

5. The sample tube rack of claim 1, further comprising a plurality of upper openings, a plurality of intermediate openings, and a plurality of supporting positions arranged in aligned grids.

6. The sample tube rack of claim 1, wherein the at least one supporting position comprises a recess which is shaped substantially convergent, and configured to receive and/or bear a sample tube bottom of a predetermined type.

7. The sample tube rack of claim 1, wherein each of the upper and the intermediate opening comprises a rim at the surface in which it is provided, and wherein at each rim at least three flexible restraining elements are provided for steadily holding the at least one sample tube, wherein the flexible restraining elements extend substantially downwards from the rim, such that they extend towards a vertical axis through the center of the respective opening.

8. The sample tube rack of claim 1, wherein the upper part, the intermediate part, and the lower part are each provided as an injection molding.

9. The sample tube rack of claim 1, wherein the upper part and the intermediate part are identical in construction.

10. The sample tube rack of claim 1, further comprising first connecting features for enabling a plug connection of the intermediate part with both the upper part and the lower part, wherein a first lower side of the upper surface includes at least one first pin protruding downwards and out of the first lower side configured to engage the intermediate surface, and wherein a second lower side of the intermediate surface includes at least one second pin protruding downwards and out of the second lower side configured to engage the supporting surface.

11. The sample tube rack of claim 10, further comprising second connecting features to connect the intermediate part with the upper part and the lower part, the second connecting features include snap-in holes along an upper rim of the intermediate part and snap-in noses positioned along a lower rim of the intermediate part, the snap-in holes of the intermediate part configured to engage with snap-in noses positioned along a lower rim of the upper part, and the snap-in noses of the intermediate part configured to engage with snap-in holes along an upper rim of the lower part.

12. The sample tube rack of claim 1, wherein the third walls extend to a lower part end rim at the bottom of the lower part, the lower part end rim defining a gap in one of the third walls to allow for an aligned arrangement on a rack resting area, and wherein the lower part end rim comprises a lift-off prevention feature configured to prevent an unintended lifting of the sample tube rack from the rack resting area.

13. The sample tube rack of claim 1, wherein the sample tube rack is stackable on and/or below identically constructed sample tube racks, and
   wherein a lower side of the supporting surface includes a protrusion extending downwards from the lower side, the protrusion including an RFID-tag receiving area configured to receive an RFID-tag.

14. The sample tube rack of claim 1, wherein identification information is provided on a lateral side of the sample tube rack in an optically readable form or
   wherein the upper part, the intermediate part, and the lower part are sufficient to enable a steady sample tube receiving function of the sample tube rack.

15. The sample tube rack of claim 1, wherein the at least one of the third walls with the at least one gripping orifice is arranged adjacent to the supporting surface and is substantially orthogonal to the supporting surface.

16. The sample tube rack of claim 1, wherein the at least one supporting position comprises a recess which is shaped substantially conically, and configured to receive and/or bear a sample tube bottom of a predetermined type.

17. The sample tube rack of claim 1, wherein the sample tube rack is stackable on and/or below identically constructed sample tube racks, and
wherein the supporting surface includes an RFID-tag receiving area defining a recess in the supporting surface configured to receive an RFID-tag.

18. The sample tube rack of claim 1, wherein identification information is provided on a lateral side of the sample tube rack in an optically readable form and
wherein the upper part, the intermediate part, and the lower part are sufficient to enable a steady sample tube receiving function of the sample tube rack.

19. A sample tube rack for receiving at least one sample tube, the sample tube rack comprising:
an upper part comprising an upper surface and first walls extending around the upper surface and in a non-parallel direction to the upper surface, wherein at least one upper opening for receiving the at least one sample tube is provided in the upper surface;
an intermediate part comprising an intermediate surface and second walls extending around the intermediate surface and in a non-parallel direction to the intermediate surface, wherein at least one intermediate opening for receiving the at least one sample tube is provided in the intermediate surface; and
a lower part comprising a supporting surface, an underside support surface opposite the supporting surface, and third walls extending around the supporting surface in a non-parallel direction to the supporting surface, wherein at least one supporting position for supporting the at least one sample tube is provided in the supporting surface;
wherein the intermediate surface of the intermediate part is connected to the first walls of the upper part and the second walls of the intermediate part are connected to the supporting surface of the lower part such that the at least one upper opening is substantially aligned above the at least one intermediate opening and above the at least one supporting position for receiving the at least one sample tube,
wherein at least one gripping orifice is provided through at least one of the third walls of the lower part, the at least one gripping orifice including a full circumference provided by the lower part, the full circumference including a top portion and a bottom portion opposite the top portion, wherein the underside support surface is above the top portion of the full circumference of the at least one gripping orifice; and
wherein a thumb rest feature is arranged above the at least one gripping orifice, the thumb rest feature including at least one of:
a first lateral protrusion extending from at least one wall of the first walls of the upper part, the first lateral protrusion arranged above the at least one gripping orifice such that the first lateral protrusion extends laterally from a first perimeter of the upper surface of the upper part; and
a second lateral protrusion extending from at least one wall of the second walls of the intermediate part, the second lateral protrusion arranged above the at least one gripping orifice such that the second lateral protrusion extends laterally from a second perimeter of the intermediate surface of the intermediate part.

20. A sample tube rack for receiving at least one sample tube, the sample tube rack comprising:
an upper part comprising an upper surface and first walls extending around the upper surface to an upper part end rim, the first walls extending in a non-parallel direction to the upper surface, wherein at least one upper opening for receiving the at least one sample tube is provided in the upper surface;
an intermediate part comprising an intermediate surface and second walls extending around the intermediate surface to an intermediate part end rim, the second walls extending in a non-parallel direction to the intermediate surface, wherein at least one intermediate opening for receiving the at least one sample tube is provided in the intermediate surface; and
a lower part comprising a supporting surface and third walls extending around the supporting surface to a lower part end rim, the third walls extending in a non-parallel direction to the supporting surface; wherein at least one supporting position for supporting the at least one sample tube is provided in the supporting surface;
wherein the intermediate surface of the intermediate part is connected to the first walls of the upper part and the second walls of the intermediate part are connected to the supporting surface of the lower part such that the at least one upper opening is substantially aligned above the at least one intermediate opening and above the at least one supporting position for receiving the at least one sample tube;
wherein at least one gripping orifice is provided through one of the third walls of the lower part, wherein the at least one gripping orifice comprises a full circumference provided by the lower part;
wherein a thumb rest feature is arranged above the at least one gripping orifice, the thumb rest feature including at least one of:
a first lateral protrusion extending from at least one wall of the first walls of the upper part arranged above the at least one gripping orifice such that the first lateral protrusion extends laterally from the upper part end rim; and
a second lateral protrusion extending from at least one wall of the second walls of the intermediate part arranged above the at least one gripping orifice such that the second lateral protrusion extends laterally from the intermediate part end rim.

* * * * *